US009542680B2

(12) United States Patent
Teruyama et al.

(10) Patent No.: US 9,542,680 B2
(45) Date of Patent: Jan. 10, 2017

(54) INFORMATION PROCESSING APPARATUS, INFORMATION PROCESSING METHOD, PROGRAM, AND INFORMATION PROCESSING SYSTEM

(75) Inventors: Katsuyuki Teruyama, Tokyo (JP); Tadashi Morita, Tokyo (JP); Hiroaki Hamada, Kanagawa (JP); Masato Kita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1070 days.

(21) Appl. No.: 12/476,819

(22) Filed: Jun. 2, 2009

(65) Prior Publication Data

US 2009/0303015 A1 Dec. 10, 2009

(30) Foreign Application Priority Data

Jun. 4, 2008 (JP) ................................. 2008-146501

(51) Int. Cl.
*G06K 7/01* (2006.01)
*G06Q 20/32* (2012.01)

(52) U.S. Cl.
CPC .......... *G06Q 20/3278* (2013.01); *G06Q 20/32* (2013.01); *G06Q 20/3226* (2013.01)

(58) Field of Classification Search
CPC .............. G06K 7/0008; G06K 19/0723; G06K 7/10039; G06Q 20/3278; G06Q 20/32; G06Q 20/3226
USPC .... 340/10.1, 10.2, 10.31, 10.4, 10.33, 10.34
See application file for complete search history.

(56) References Cited

U.S. PATENT DOCUMENTS 3,839,717 A * 10/1974 Paul ....................... G08G 1/017 340/901
4,985,615 A * 1/1991 Iijima ........................... 235/492
6,757,779 B1 * 6/2004 Nataraj et al. ................ 711/108
2004/0140351 A1 7/2004 Flugge
2004/0153914 A1 * 8/2004 El-Batal ........................ 714/724
2007/0024436 A1 2/2007 Bandy
2009/0212909 A1 * 8/2009 Burger ............. G06K 19/06206 340/5.81

FOREIGN PATENT DOCUMENTS

EP 0864843 9/1989
JP 05-073490 3/1993

(Continued)

OTHER PUBLICATIONS

Japanese Office Action for corresponding JP 2008-146501 issued on Apr. 13, 2010.

(Continued)

*Primary Examiner* — Jennifer Mehmood
*Assistant Examiner* — Yong Hang Jiang
(74) *Attorney, Agent, or Firm* — K&L Gates LLP

(57) ABSTRACT

An information processing apparatus includes: processing sections that have respective identification information and that perform processing corresponding to a request from another information processing apparatus; and a reporting section that stores the respective identification information of the processing sections and, instead of the processing sections, that reports the identification information to the another information processing apparatus in response to a request for reporting the identification information, the request being issued from the another information processing apparatus.

22 Claims, 23 Drawing Sheets

11 VDD 33 42 MEMORY VDD MAIN CONTROLLER ST1 ST2 ST3 DATA 62 32 41 34−1 43−1 61−1 MEMORY VDD MEMORY VDD 31 SECURE ELEMENT 51 61−2 RF-DATA DATA ST 52−1 34−2 43−2 61−3 FRONT END MEMORY VDD RF-DATA DATAB SECURE ELEMENT DATA1 DATA2 DATA ST DATA3 34−3 43−3 52−2 MEMORY VDD 52−3 SECURE ELEMENT DATA ST

(56) References Cited

FOREIGN PATENT DOCUMENTS

| | | |
|---|---|---|
| JP | 07-325895 | 12/1995 |
| JP | 09-198157 | 7/1997 |
| JP | 2003-317042 | 11/2003 |
| JP | 2005-011319 | 1/2005 |
| JP | 2005-242444 | 8/2005 |
| JP | 2008-010011 | 1/2008 |
| JP | 2008-012909 | 1/2008 |
| JP | 2008-027199 | 2/2008 |
| JP | 2008-102886 | 5/2008 |

OTHER PUBLICATIONS

Stevan Preradovic, et al.: "RFID Readers—A Review" Electrical and Computer Engineering, 2006, ICECE '06. International Conference On, IEEE, PI, Dec. 1, 2006, pp. 100-103, XP031082819 ISBN: 978-984-32-3814-6.

European Search Report (09007309.9-2413) issued on Dec. 3, 2009.

European Patent Office, Extended European Search Report, issued in connection with European Patent Application No. 12001593.8, dated May 18, 2012. (6 pages).

* cited by examiner

FIG. 4A

| SE ON Request | SE No. |
|---|---|

FIG. 4B

| SE ON Response | Status |
|---|---|

FIG. 5A

| Polling Request | SC | OPTION | TSN |
|---|---|---|---|

FIG. 5B

| Polling Response | ID | PAD | SC |
|---|---|---|---|

FIG. 6A

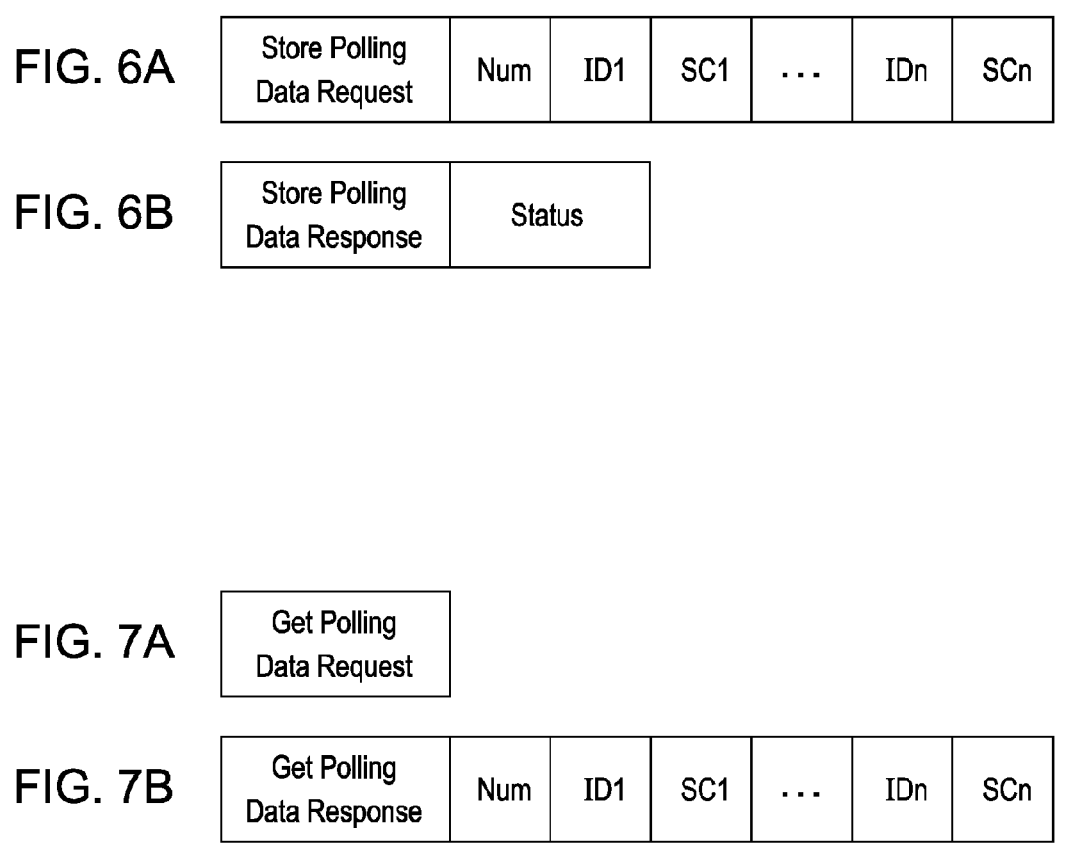

| Store Polling Data Request | Num | ID1 | SC1 | . . . | IDn | SCn |
|---|---|---|---|---|---|---|

FIG. 6B

| Store Polling Data Response | Status |
|---|---|

FIG. 7A

| Get Polling Data Request |
|---|

FIG. 7B

| Get Polling Data Response | Num | ID1 | SC1 | . . . | IDn | SCn |
|---|---|---|---|---|---|---|

FIG. 9

| TERMINAL NUMBER | IDENTIFICATION INFORMATION | |
|---|---|---|
| | ID | SC |
| 0 | IDB | SCB |
| 1 | ID1 | SC1 |
| 2 | ID2 | SC2 |
| 3 | ID3 | SC3 |

FIG. 10

| TERMINAL NUMBER | IDENTIFICATION INFORMATION | |
|---|---|---|
| | ID | SC |
| 0 | IDB | SCB |
| 1 | n/a | n/a |
| 2 | ID2 | SC2 |
| 3 | ID3 | SC3 |

FIG. 13

| TERMINAL NUMBER | IDENTIFICATION INFORMATION | |
|---|---|---|
| | ID | SC |
| 0 | IDB | SCB |
| 1 | ID1 | SC1 |
| 2 | n/a | n/a |
| 3 | ID3 | SC3 |

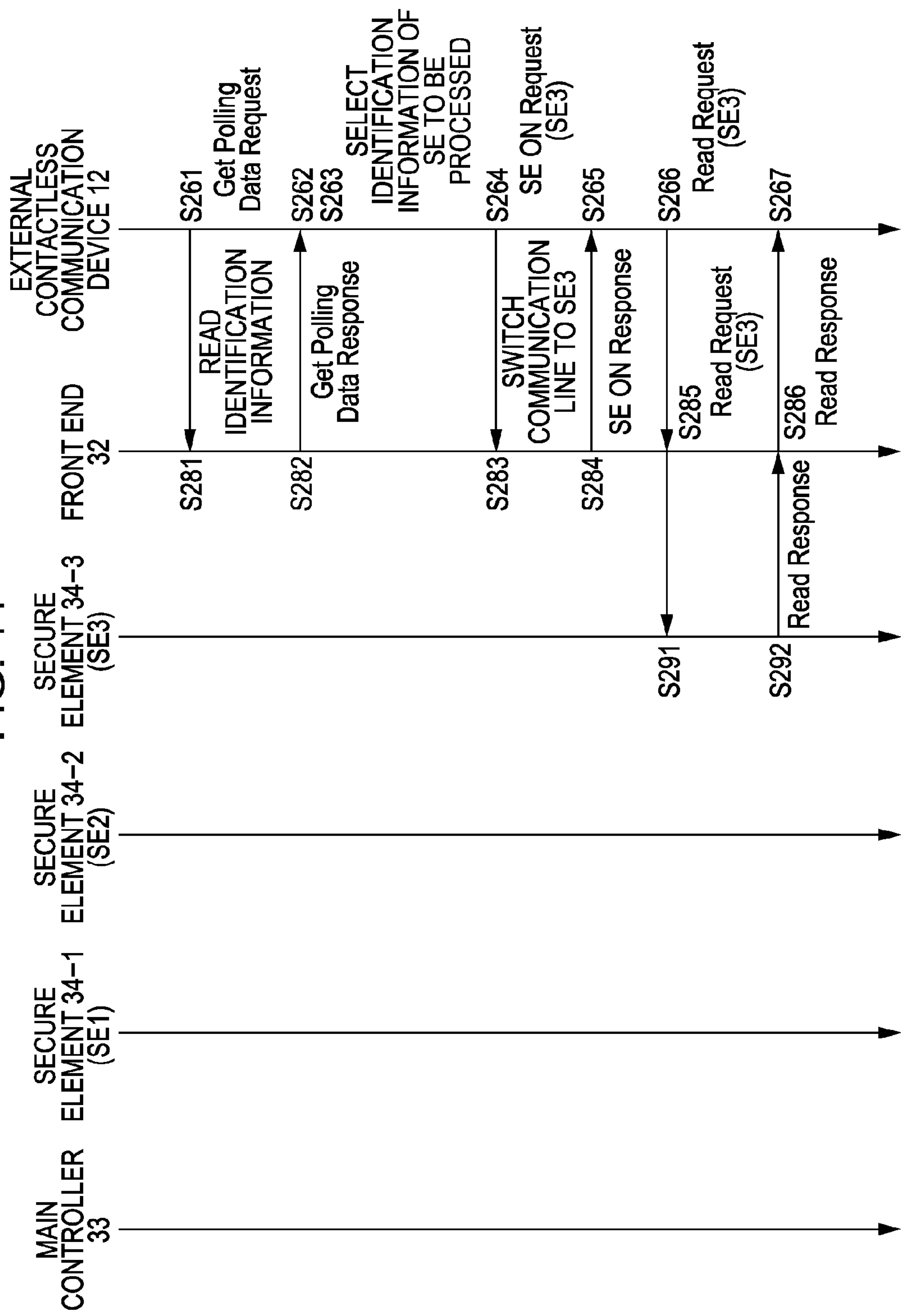
FIG. 14
EXTERNAL CONTACTLESS COMMUNICATION DEVICE 12
FRONT END 32
SECURE ELEMENT 34-3 (SE3)
SECURE ELEMENT 34-2 (SE2)
SECURE ELEMENT 34-1 (SE1)
MAIN CONTROLLER 33
S261 Get Polling Data Request
S281 READ IDENTIFICATION INFORMATION
S282 Get Polling Data Response
S262
S263 SELECT IDENTIFICATION INFORMATION OF SE TO BE PROCESSED
S264 SE ON Request (SE3)
S283 SWITCH COMMUNICATION LINE TO SE3
S284 SE ON Response
S265
S266 Read Request (SE3)
S285 Read Request (SE3)
S291
S292 Read Response
S286 Read Response
S267

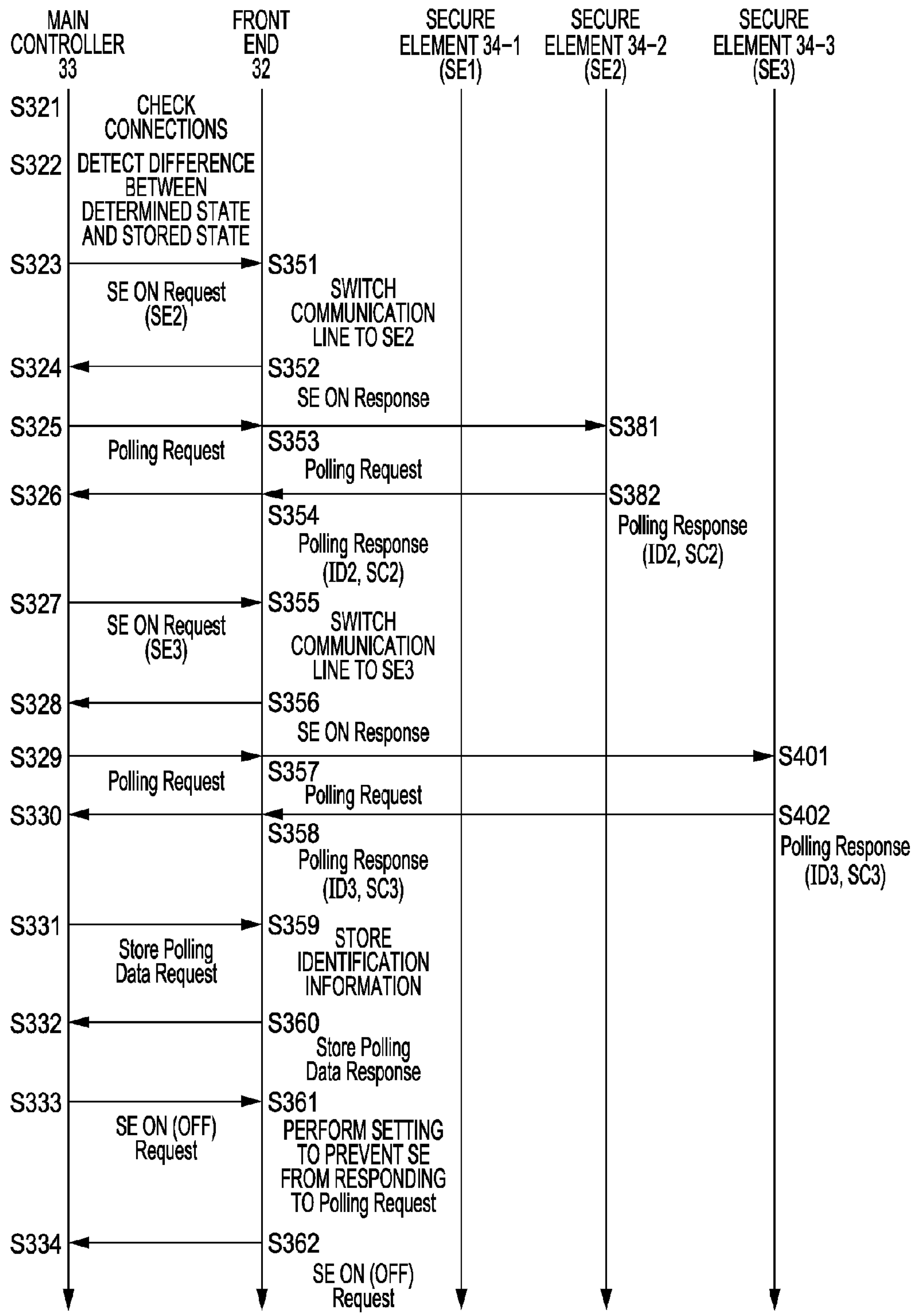
FIG. 15
MAIN CONTROLLER 33
FRONT END 32
SECURE ELEMENT 34-1 (SE1)
SECURE ELEMENT 34-2 (SE2)
SECURE ELEMENT 34-3 (SE3)
S321 CHECK CONNECTIONS
S322 DETECT DIFFERENCE BETWEEN DETERMINED STATE AND STORED STATE
S323 SE ON Request (SE2)
S351 SWITCH COMMUNICATION LINE TO SE2
S324
S352 SE ON Response
S325 Polling Request
S353 Polling Request
S381
S326
S354 Polling Response (ID2, SC2)
S382 Polling Response (ID2, SC2)
S327 SE ON Request (SE3)
S355 SWITCH COMMUNICATION LINE TO SE3
S328
S356 SE ON Response
S329 Polling Request
S357 Polling Request
S401
S330
S358 Polling Response (ID3, SC3)
S402 Polling Response (ID3, SC3)
S331 Store Polling Data Request
S359 STORE IDENTIFICATION INFORMATION
S332
S360 Store Polling Data Response
S333 SE ON (OFF) Request
S361 PERFORM SETTING TO PREVENT SE FROM RESPONDING TO Polling Request
S334
S362 SE ON (OFF) Request

FIG. 17

| TIME SLOT NO. | IDENTIFICATION INFORMATION | |
|---|---|---|
| | ID | SC |
| 0 | IDB | SCB |
| 1 | n/a | n/a |
| 2 | ID2 | SC2 |
| 3 | ID3 | SC2 |

FIG. 18

| TIME SLOT NO. | IDENTIFICATION INFORMATION |
|---|---|
| 0 | IDB, SCB |
| 2 | ID2, SC2 |
| 3 | ID3, SC2 |

FIG. 19

| TIME SLOT NO. | IDENTIFICATION INFORMATION |
|---|---|
| 0 | IDB, SCB |

FIG. 20

| TIME SLOT NO. | IDENTIFICATION INFORMATION |
|---|---|
| 2 | ID2, SC2 |
| 3 | ID3, SC2 |

FIG. 21

| TIME SLOT NO. | IDENTIFICATION INFORMATION |
|---|---|
| 1 | ID1, SC1 |

VDD
62
134
131
132
133
42
MEMORY
MAIN CONTROLLER
VDD
STI
STO
DATA
33
43-1
MEMORY
SECURE ELEMENT
VDD
STI
STO
DATA
34-1
43-2
MEMORY
SECURE ELEMENT
VDD
STI
STO
DATA
34-2
43-3
MEMORY
SECURE ELEMENT
VDD
STI
STO
DATA
34-3
51
52-1
52-2
52-3
11
32
41
MEMORY
VDD
RF-DATA
FRONT END
RF-DATA
DATAB
DATA1
DATA2
DATA3
31

FIG. 23A

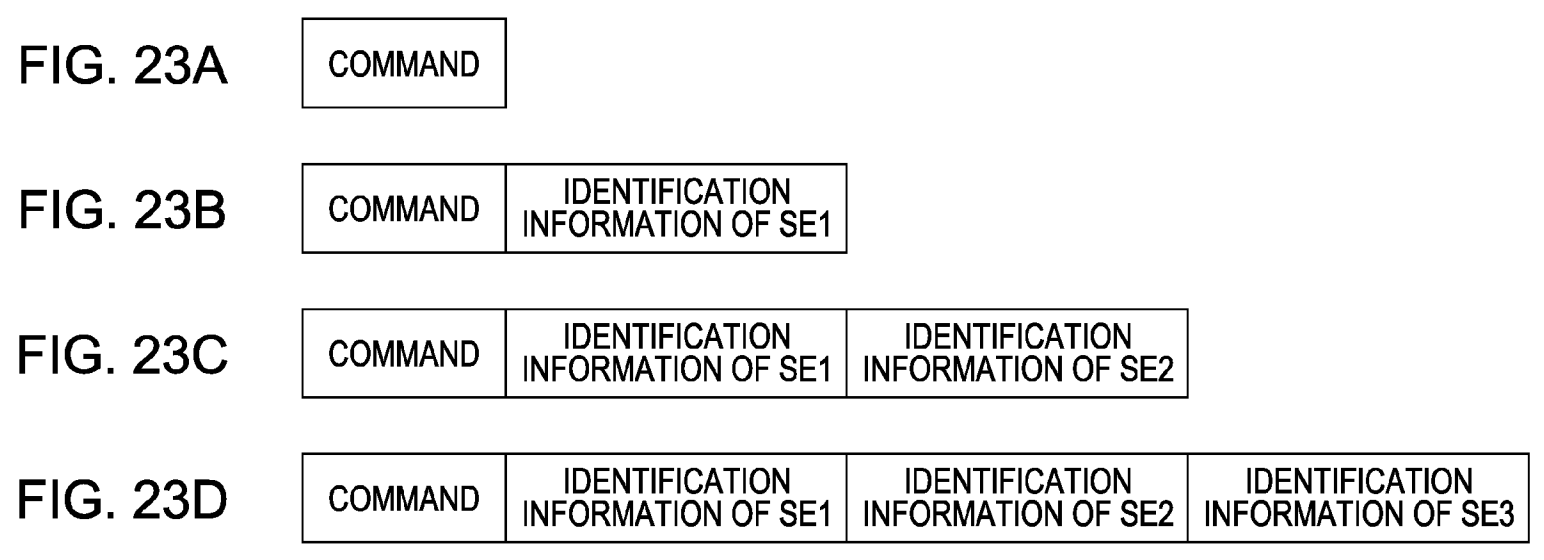

COMMAND

FIG. 23B

COMMAND | IDENTIFICATION INFORMATION OF SE1

FIG. 23C

COMMAND | IDENTIFICATION INFORMATION OF SE1 | IDENTIFICATION INFORMATION OF SE2

FIG. 23D

COMMAND | IDENTIFICATION INFORMATION OF SE1 | IDENTIFICATION INFORMATION OF SE2 | IDENTIFICATION INFORMATION OF SE3

11
VDD
62
134
131
132
133
VDD
STI
STO
MEMORY
MAIN CONTROLLER
DATA
42
33
SECURE ELEMENT
43-1
34-1
43-2
34-2
43-3
34-3
111
FRONT END
RF-DATA
DATAB
DATA1
DATA2
DATA3
41
32
31

EXTERNAL CONTACTLESS COMMUNICATION DEVICE 12
FRONT END 32
SECURE ELEMENT 34-3 (SE3)
SECURE ELEMENT 34-2 (SE2)
SECURE ELEMENT 34-1 (SE1)
MAIN CONTROLLER 33
S611
Get Polling Data Request
S631
READ IDENTIFICATION INFORMATION
S632
Get Polling Data Response
S612
S613
SELECT IDENTIFICATION INFORMATION OF SE TO BE PROCESSED
S614
Read Request (SE3)
S633
Read Request (SE3)
S651
S652
Read Response
S634
Read Response
S615

11
VDD
62
61−1
61−2
61−3
33
42
MEMORY
MAIN CONTROLLER
VDD
ST1
ST2
ST3
DATA
34−1
43−1
MEMORY
SECURE ELEMENT
VDD
ST
DATA
34−2
43−2
MEMORY
SECURE ELEMENT
VDD
ST
DATA
34−3
43−3
MEMORY
SECURE ELEMENT
VDD
ST
DATA
111
32
41
MEMORY
VDD
RF-DATA
FRONT END
RF-DATA
DATAB
DATA1
DATA2
DATA3
31

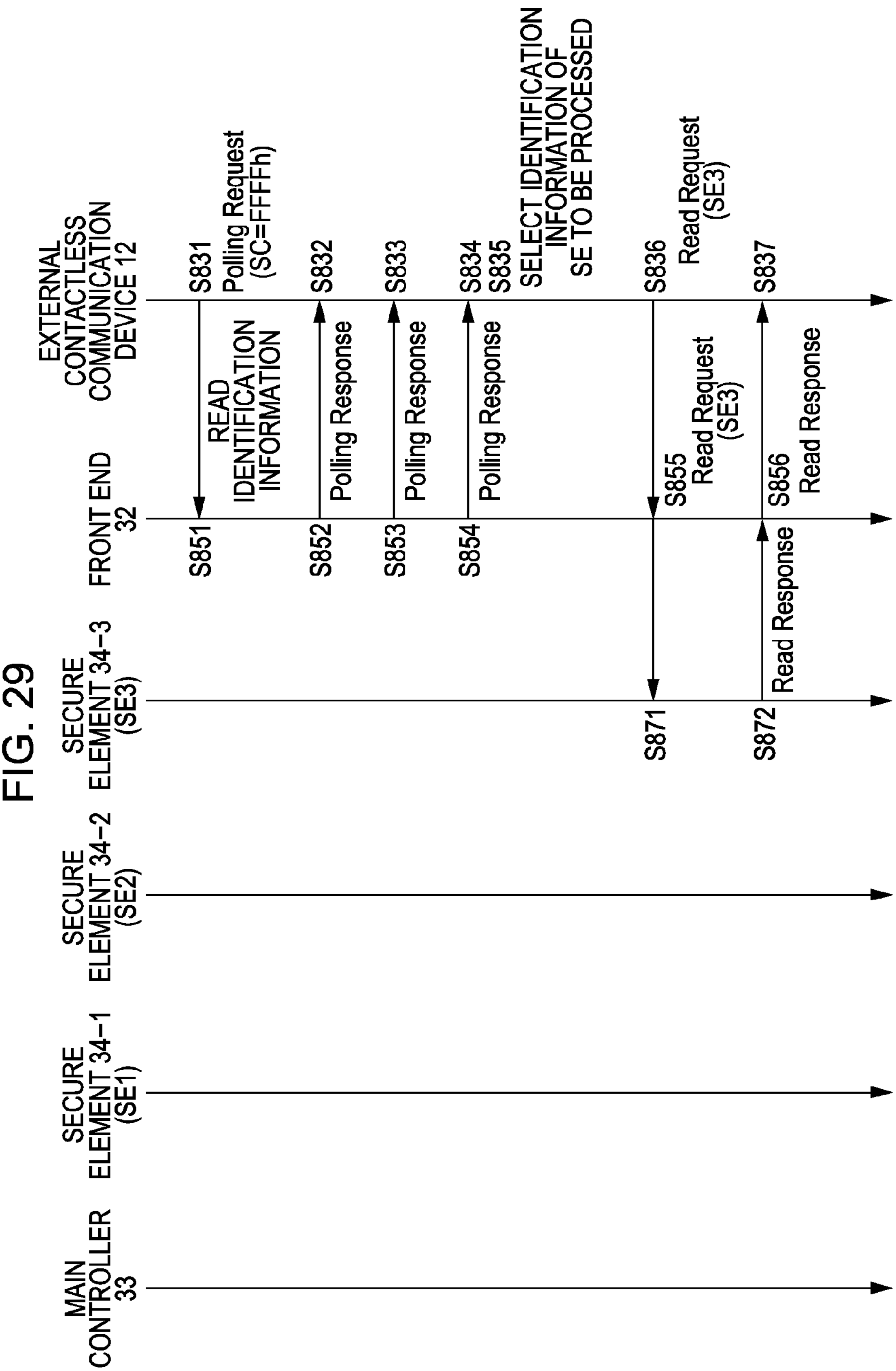
FIG. 29
EXTERNAL CONTACTLESS COMMUNICATION DEVICE 12
FRONT END 32
SECURE ELEMENT 34-3 (SE3)
SECURE ELEMENT 34-2 (SE2)
SECURE ELEMENT 34-1 (SE1)
MAIN CONTROLLER 33
S831
Polling Request (SC=FFFFh)
S851
READ IDENTIFICATION INFORMATION
S832
S852
Polling Response
S833
S853
Polling Response
S834
S854
Polling Response
S835
SELECT IDENTIFICATION INFORMATION OF SE TO BE PROCESSED
S836
Read Request (SE3)
S855
Read Requst (SE3)
S871
S872
Read Response
S856
Read Response
S837

INFORMATION PROCESSING APPARATUS, INFORMATION PROCESSING METHOD, PROGRAM, AND INFORMATION PROCESSING SYSTEM

CROSS REFERENCES TO RELATED APPLICATIONS

The present application claims priority to Japanese Priority Patent Application JP 2008-146501 filed in the Japan Patent Office on Jun. 4, 2008, the entire content of which is hereby incorporated by reference.

BACKGROUND

The present application relates to information processing apparatuses, information processing methods, programs, and information processing systems. In particular, the present application relates to an information processing apparatus, an information processing method, a program, and an information processing system which are capable of quickly obtaining identification information.

For example, Japanese Unexamined Patent Application Publication No. 2003-317042 discloses an IC (integrated circuit) card that has secure elements for storing secure data of applications, such as electronic money. A reader/writer that reads/writes data from/to an IC card performs contactless communication based on NFC (near field communication) standards with a secure element or secure elements.

When an IC card has multiple secure elements, the reader/writer typically has to select, from the security elements, one secure element with which communication is to be actually performed.

In order to select one secure element with which communication is to be actually performed from the secure elements, the reader/writer requests all of the secure elements to report the identification numbers thereof. In response to the request, each secure element reports its identification information to the reader/writer at timing indicated by a time slot randomly selected by the secure element.

SUMMARY

However, since the secure elements randomly and individually select the time slots, the time slots selected by the security elements may match each other. In this case, collision occurs as in a case in which multiple IC cards are present in the vicinity of the reader/writer, as disclosed in Japanese Unexamined Patent Application Publication No. 2003-317042, and it becomes difficult for the reader/writer to quickly obtain the identification numbers of all the secure elements.

Accordingly, it is desirable to make it possible to quickly obtaining the identification information.

In an embodiment, there is provided an information processing apparatus. The information processing apparatus includes: processing sections that have respective identification information and that perform processing corresponding to a request from another information processing apparatus; and a reporting section that stores the respective identification information of the processing sections and, instead of the processing sections, that reports the identification information to the another information processing apparatus in response to a request for reporting the identification information, the request being issued from the another information processing apparatus.

According to another embodiment, there is provided an information processing apparatus. The information processing apparatus includes: an obtaining section that obtains identification information of processing sections from a reporting section instead of the processing sections, the processing sections and the reporting section being included in another information processing apparatus, the processing sections holding the identification information, and the reporting section obtaining the identification information from the processing sections and storing the identification information; a selecting section that selects, from the obtained identification information of the processing sections, the identification information of the processing section to be processed; and an executing section that causes the processing section corresponding to the selected identification information to execute predetermined processing.

According to yet another embodiment, there is provided an information processing system. The information processing system includes: a first information processing apparatus that has a reporting section and processing sections, the reporting section obtaining identification information of the processing sections and storing the obtained identification information; and a second information processing apparatus that issues, to the first information processing apparatus, a request for reporting the identification information. The reporting section in the first information processing apparatus, instead of the processing sections, reports the stored identification information to the second information processing apparatus in response to a request issued from the second information processing apparatus. The second information processing apparatus specifies the processing section by using the identification information selected from the reported identification information and issues a request for predetermined processing to the specified processing section. Of the processing sections in the first information processing apparatus, the processing section specified by the second information processing apparatus performs the predetermined processing.

According to another embodiment, a reporting section obtains identification information of processing sections and stores the identification information; the reporting section, instead of the processing sections, reports the identification information to another information processing apparatus in response to a request for reporting the identification information, the request being issued from the another information processing apparatus; and, of the processing sections, the processing section specified by the identification information reported to the another information processing apparatus performs processing corresponding to a request issued from the another information processing apparatus.

According to still another embodiment, an obtaining section obtains identification information of processing sections from a reporting section instead of the processing sections, the processing sections and the reporting section being included in another information processing apparatus, the processing sections holding the identification information, and the reporting section obtaining the identification information from the processing sections and storing the identification information; a selecting section selects, from the obtained identification information of the processing sections, the identification information of the processing section to be processed; and an executing section causes the processing section corresponding to the selected identification information to execute predetermined processing.

According to a further embodiment, a reporting section in a first information processing apparatus obtains identification information of processing sections in the first information processing apparatus and stores the obtained identification information; and a second information processing apparatus issues, to the first information processing apparatus, a request for reporting the identification information. The reporting section in the first information processing apparatus, instead of the processing sections, reports the stored identification information to the second information processing apparatus in response to a request issued from the second information processing apparatus. The second information processing apparatus specifies the processing section by using the identification information selected from the reported identification information and issues a request for predetermined processing to the specified processing section. Of the processing sections in the first information processing apparatus, the processing section specified by the second information processing apparatus performs the predetermined processing.

As described above, according to an embodiment, it is possible to quickly obtain the identification information.

Additional features and advantages are described in, and will be apparent from, the following Detailed Description and the figures.

BRIEF DESCRIPTION OF THE FIGURES

FIGS. 4A and 4B show packet structures of an SE ON request and an SE ON response, respectively;

FIGS. 5A and 5B show packet structures of a polling request and a polling response, respectively;

FIGS. 6A and 6B show packet structures of a store polling data request and a store polling data response, respectively;

FIGS. 7A and 7B show packet structures of a get polling data request and a get polling data response, respectively;

FIG. 9 illustrates the stored identification information;

FIG. 10 illustrates the stored identification information;

FIG. 13 illustrates the stored identification information;

FIG. 14 is a flowchart illustrating access processing performed by the external contactless communication device;

FIG. 15 is a flowchart illustrating processing for storing the identification information;

FIG. 17 illustrates the stored identification information;

FIG. 18 illustrates the identification information to be transmitted;

FIG. 19 illustrates the identification information to be transmitted;

FIG. 20 illustrates the identification information to be transmitted;

FIG. 21 illustrates the identification information to be transmitted;

FIGS. 23A to 23D illustrates commands;

FIG. 29 is a flowchart illustrating access processing performed by the external contactless communication device.

DETAILED DESCRIPTION

The present application will be described below with reference to the accompanying drawings according to an embodiment.

Figure 1:
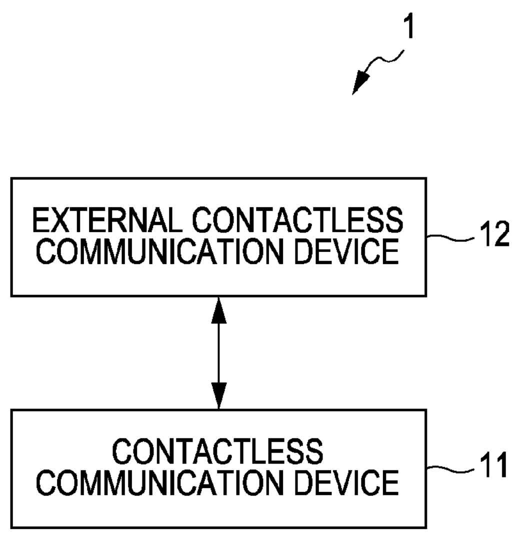
FIG. 1 is a block diagram showing the configuration of an information processing system according to one embodiment.

FIG. 1 is a diagram showing an information processing system according to an embodiment. This information processing system 1 includes a contactless communication device 11 serving as an information processing apparatus and an external contactless communication device 12 serving as another information processing apparatus. Examples of the contactless communication device 11 include an IC card and a mobile phone, and one example of the external countless communication device 12 is a reader/writer placed at a shop, a ticket gate for a transportation system, or the like. The contactless communication device 11 and the external contactless communication device 12 perform contactless communication with each other, for example, based on an NFC (near field communication) standard.

A user carries the contactless communication device 11 and holds it against the external contactless communication device 12 to cause the contactless communication device 11 to execute contactless communication with the external contactless communication device 12. In response, the external contactless communication device 12 can execute processing, such as billing and other predetermined processing, on the contactless communication device 11.

Figure 2:
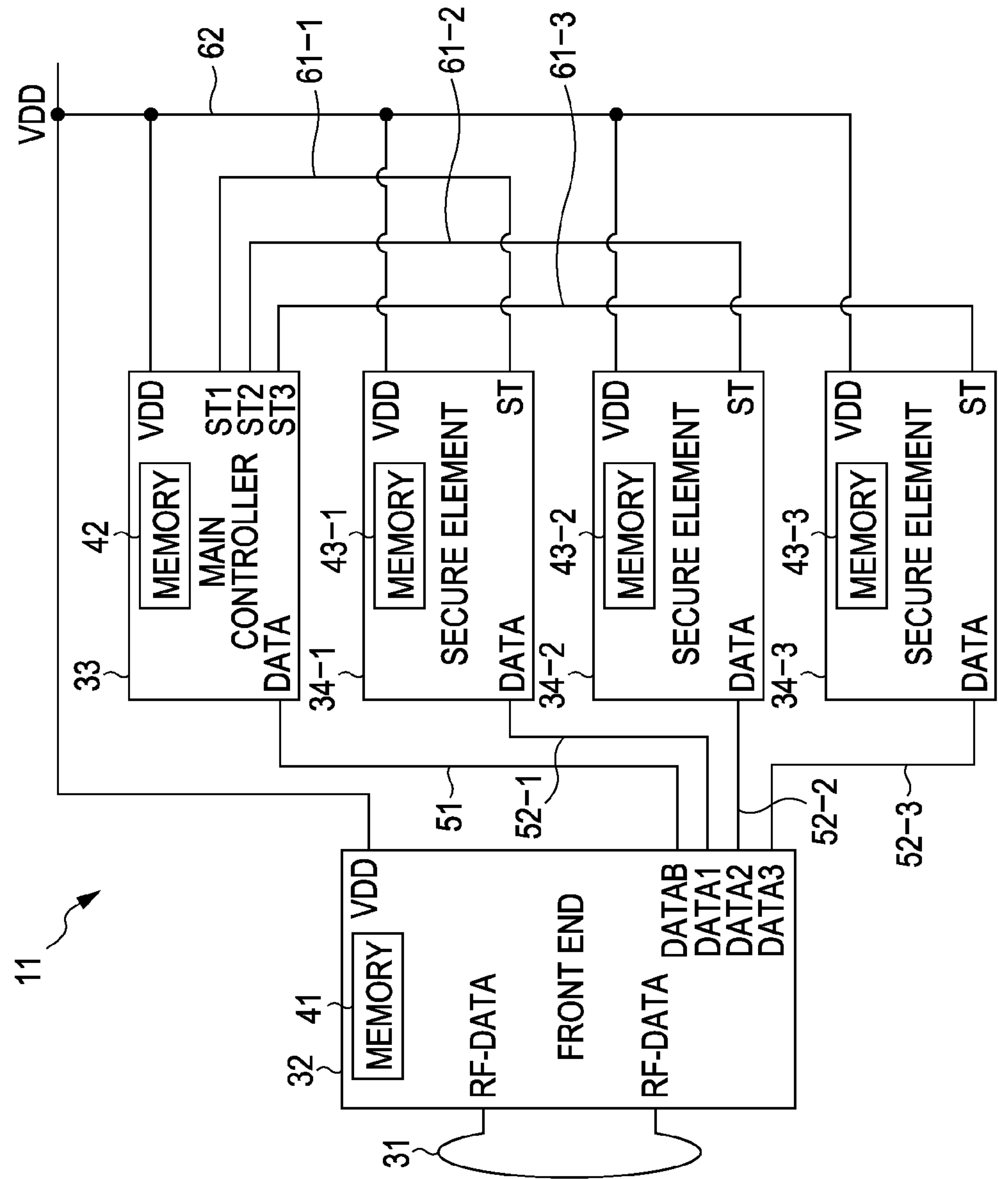
FIG. 2 is a block diagram showing the configuration of a contactless communication device according to one embodiment.

FIG. 2 shows the configuration of the contactless communication device 11 according to the embodiment. The contactless communication device 11 includes an antenna 31, a front end (FE) 32, a main controller (MC) 33, and secure elements (SE) 34-1 to 34-3. The secure elements (SE) 34-1 to 34-3 are simply referred to as "secure elements 34", unless they should be distinguished from each other. The same applies to other sections.

The antenna 31 transmits/receives electromagnetic waves to/from an antenna (not shown) of the external contactless communication device 12. The front end 32 serves as a reporting section that stores respective identification information of the secure elements 34 and, instead of the secure elements 34, reports the identification information to the external contactless communication device 12 in response to a request for reporting the identification information, the request being issued from the external contactless communication device 12. The front end 32 has terminals RF-DATA to which the antenna 31 is connected and transmits/receives a signal to/from the external contactless communication device 12 via the antenna 31. The front end 32 also has a volatile or nonvolatile memory 41, which stores identification information of the main controller 33 and the identification information of the secure elements 34-1 to 34-3.

The front end 32 further has terminals DATAB, DATA1, DATA2, and DATA3, which are individually connected to terminals DATA of the main controller 33 and the secure elements 34-1 to 34-3 through corresponding lines 51 and 52-1 to 52-3.

When the contactless communication device 11 is powered on and the secure element(s) 34 is attached or detached, the main controller 33 serves as a control section that collects the identification information of the secure element(s) 34, supplies the collected identification information and the identification information of the main controller 33 to the front end 32, and causes the identification information be stored in the memory 41 therein. The memory 42 in the main controller 33 holds a unit identification number (IDB) and an application number (SCB) of the main controller 33 as the identification information.

In order to check connections, a terminal ST of the secure element 34-1 is connected to a terminal ST1 of the main controller 33 through a line 61-1, a terminal ST of the secure element 34-2 is connected to a terminal ST2 of the main controller 33 through a line 61-2, and a terminal ST of the secure element 34-3 is connected to a terminal ST3 of the main controller 33 through a line 61-3. Thus, the main controller 33 can check connection states of the secure elements 34.

As described above, the terminals ST1, ST2, and ST3 of the main controller 33 are individually connected to the secure elements 34-1, 34-2, and 34-3 on a one-to-one basis. The terminals DATA1, DATA2, and DATA3 of the front end 32 are individually connected to the terminals DATA of the secure elements 34-1 to 34-3 on a one-to-on basis. Thus, the terminals DATA1, DATA2, and DATA3 of the front end 32 correspond to the terminals ST1, ST2, and ST3 of the main controller 33, respectively.

The secure elements 34-1 to 34-3 hold their individual identification information in respective nonvolatile memories 43-1 to 43-3 and serve as processing sections for performing processing corresponding to requests issued from the external contactless communication device 12. The secure elements 34 perform processing based on predetermined applications. Of the secure elements 34, the secure element 34-1 holds, in the nonvolatile memory 43-1, a unit identification number (ID1) and an application number (SC1) of the secure element 34-1 as the identification information.

Similarly, the secure element 34-2 holds, in the nonvolatile memory 43-2, a unit identification number (ID2) and an application number (SC2) of the secure element 34-2 as the identification information, and the secure element 34-3 holds, in the nonvolatile memory 43-3, a unit identification number (ID3) and an application number (SC3) of the secure element 34-3 as the identification information.

In the same manner as the memories 41 and 42, the memories 43-1 to 43-3 store computer programs for executing various types of processing, as appropriate.

Power is supplied to terminals VDD of the front end 32, the main controller 33, and the secure elements 34-1 to 34-3 through a line 62. The main controller 33 and the secure elements 34-1 to 34-3 have activating and deactivating functions. For example, as defined by NFC-WI (near field communication wired interface) (ISO/IEC28361), in a state in which power is supplied to the terminal VDD, each of the main controller 33 and the secure elements 34-1 to 34-3 is activated when a pulse is input to the terminal DATA and is deactivated when no pulse is input to the terminal DATA.

In the contactless communication device 11, at least one of the secure elements 34 is fixed and one or more of the secure elements 34 are detachably attached.

Figure 3:
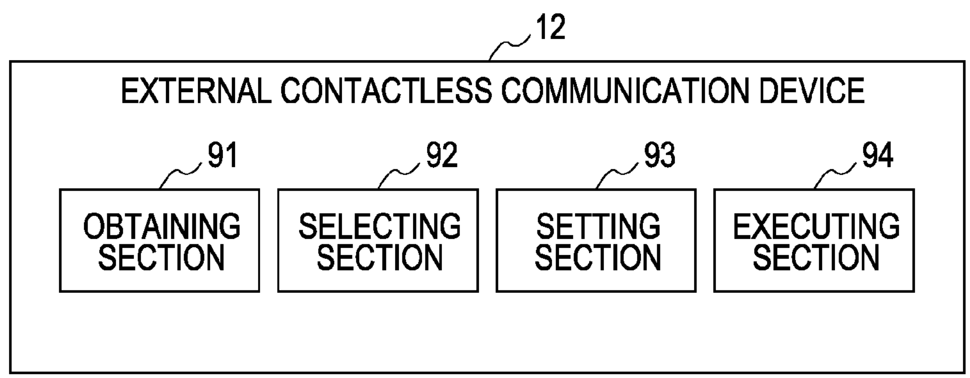
FIG. 3 is a block diagram showing the configuration of an external contactless communication device according to one embodiment.

For example, as shown in FIG. 3, the external contactless communication device 12 has a functional configuration that includes an obtaining section 91, a selecting section 92, a setting section 93, and an executing section 94.

The obtaining section 91 obtains the identification information from the front end 32 instead of the secure elements 34-1 to 34-3, the front end 32 obtaining the identification information from the secure elements 34-1 to 34-3 and storing the identification information. The obtaining section 92 selects, from the obtained multiple pieces of identification information, the identification information of the secure element 34 to be processed.

The setting section 93 sets, of the individual communication lines for the secure elements 34-1 to 34-3 connected to the front end 32, the communication line for the secure element 34 corresponding to the selected identification information. The executing section 94 causes the secure element 34 corresponding to the selected identification information to execute predetermined processing.

Packet structures of commands used by the information processing system 1 will now be described with reference to FIGS. 4A to 7B.

Figures 4A, 4B, 5A, 5B:
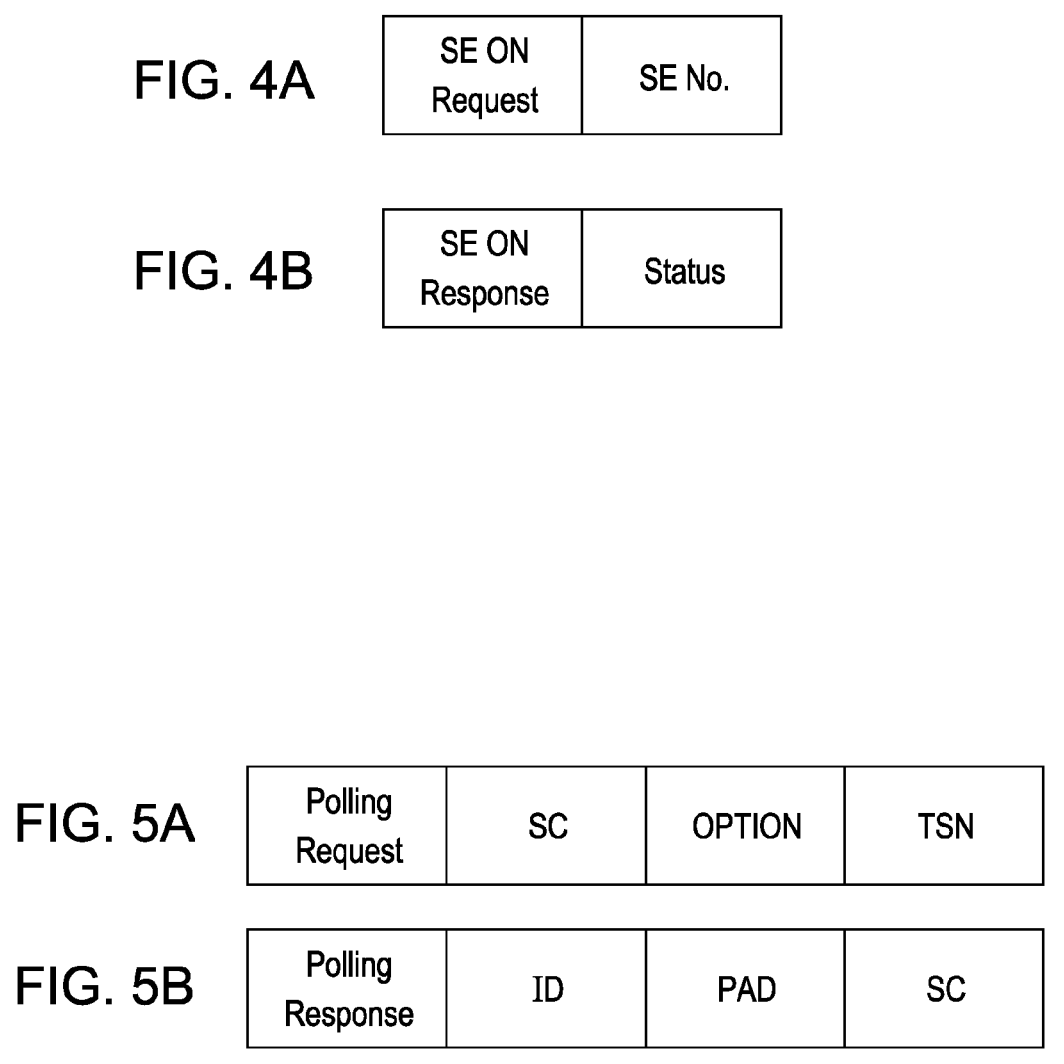

FIGS. 4A and 4B show packet structures of an SE ON request and an SE ON response, respectively. As shown in FIG. 4A, an SE number (No.) is attached to the SE ON request. The SE number indicates the number of the terminal DATA1, DATA2, or DATA3 of the front end 32. As shown in FIG. 4B, a status indicating a state is attached to the SE ON response.

Upon receiving the SE ON request, the front end 32 sets a specified terminal line of the lines 52-1 to 52-3 connected to the terminals DATA1, DATA2, and DATA3, i.e., the communication line for the specified secure element 34, and sends an SE ON response indicating the set state. When a corresponding communication line is not set, the secure element 34 is put into a deactivated state, and when a corresponding communication line is set, the secure element 34 is put into an activated state.

Upon receiving the SE ON (OFF) request, the front end 32 performs setting so as to prevent the secure element 34 from responding to a polling request or another command. For example, the front end 32 performs setting so that a polling request is not transferred to the secure element 34.

FIGS. 5A and 5B show packet structures of a polling request and a polling response, respectively. As shown in FIG. 5A, an SC, an option, and a TSN are attached to the polling request. The SC states the number of an application of the secure element 34. The secure element 34 having an application stated by the SC sends a response. However, when the SC states FFFFh, all secure elements 34 that have received the polling requests send responses.

The TSN states one time slot number of, for example, 0 to 15. The secure element 34 that has received the polling request sends a response at timing indicated by the time slot number that is smaller than or equal to the value stated by the received polling request. For example, when the TSN states the maximum number (15) of the time slot number, the secure element 34 that has received the polling request sends a response at timing indicated by the time slot number having any value of 0 to 15. The option in the polling request is used as appropriate.

As shown in FIG. 5B, an ID, a PAD, and an SC are attached to the polling response. The ID states the unit identification number of the secure element 34. The SC states the application number of the secure element 34. The PAD has padding of predetermined data.

FIGS. 6A and 6B show packet structures of a store polling data request and a store polling data response, respectively. As shown in FIG. 6A, the number "Num" of pieces of identification information and specific identification information, including unit identification numbers ID1, ID2, . . . , and IDn and application numbers SC1, SC2, . . . , and SCn, are attached to the store polling data request.

As shown in FIG. 6B, a status indicating a state is attached to the store polling data response.

Upon receiving the store polling data request, the front end 32 stores the identification information, stated thereby, in the memory 41 and sends the store polling data response stating the stored state.

FIGS. 7A and 7B show packet structures of a get polling data request and a get polling data response, respectively. For issuing a request for reading the identification information stored in the memory 41 in the front end 32, the external contactless communication device 12 outputs the get polling data request shown in FIG. 7A.

Upon receiving the get polling data request, the front end 32 sends the get polling data response. As shown in FIG. 7B, the get polling data response states the number "Num" of pieces of identification information (of the secure elements 34) and the specific identification information, including the unit identification numbers ID1, ID2, . . . , and IDn and the application numbers SC1, SC2, . . . , and SCn.

Only the front end 32 responds to the store polling data request and the get polling data request, and the secure elements 34 do not respond thereto.

Processing in which the contactless communication device 11 stores the identification information of the secure elements 34 into the memory 41 in the front end 32 will now be described with reference to FIG. 8. The processing in which the identification information of the secure elements 34 is stored in the memory 41 is executed when the contactless communication device 11 is powered on and the secure element(s) 34 is attached or detached.

In step S1, the main controller 33 checks the connections of the secure elements 34. Specifically, the main controller 33 determines whether or not the secure elements 34-1 to 34-3 are connected to the terminals ST1 to ST3.

In step S2, the main controller 33 detects a difference between the determined connection state and a state stored in the front end 32. The memory 41 stores the identification information of the corresponding connection targets in association with the terminals DATAB, DATA1, DATA2, and DATA3.

FIG. 9 is a table showing an example of the identification information stored in the memory 41. In this example, the unit identification number and the application number of the main controller 33 connected to the terminal DATAB with terminal number 0 are IDB and SCB, respectively; the unit identification number and the application number of the secure element 34-1 connected to the terminal DATA1 with terminal number 1 are ID1 and SC1, respectively; the unit identification number and the application number of the secure element 34-2 connected to the terminal DATA2 with terminal number 2 are ID2 and SC2, respectively; and the unit identification number and the application number of the secure element 34-3 connected to the terminal DATA3 with terminal number 3 are ID3 and SC3, respectively.

In contrast, for example, if the secure element 34 is not connected to the terminal DATA1 with terminal number 1, the storage state of the memory 41 becomes as shown in FIG. 10. That is, a unit identification number and an application number are not stored with respect to terminal number 1.

In this state, when the secure element 34-1 is newly connected to the terminal DATA1 with terminal number 1, a difference between the connection state and the previously stored state is that the new secure element 34 is connected to the terminal DATA1 with terminal number 1. Accordingly, processing for further storing the identification information of the new secure element 34 is further executed.

Although the identification information of the main controller 33 and the identification information of at least one fixed secure element 34 should always be stored, it is now assumed that no secure elements 34 are connected to the terminals DATA1 to DATA3. In this case, when the secure elements 34 are newly connected to the terminals DATA2 and DATA3, processing for storing the identification information of the secure elements 34 newly connected to the terminals DATA2 and DATA3 is further performed. FIG. 8 shows an example of processing in such a case.

That is, the main controller 33 checks the states of the terminals ST2 and ST3 to determine that new secure elements 34 are connected thereto. In step S3, the main controller 33 output an SE ON request (SE2) to the front end 32.

In step S31, the front end 32 receives the SE ON request (SE2) and then switches the communication line to the secure element 34-2 (SE2). Thus, only the communication line 52-2 of the lines 52-1 to 52-3 is enabled. Specifically, only the secure element 34-2 is activated and the other secure elements 34-1 and 34-3 are left in the deactivated states. As a result, compared to a case in which all secure elements 34 are always in the activated states, unwanted power consumption is reduced. In step S32, the front end 32 sends an SE ON response to the main controller 33.

In step S4, the main controller 33 receives the SE ON response to thereby make it possible to know that the communication line is switched to the line for the secure element 34-2. In step S5, the main controller 33 outputs a polling request. In step S33, the front end 32 receives the polling request via the terminal DATAB and then transfers the polling request to the secure element 34-2 through the communication line 52-2 set in step S31.

In step S51, the secure element 34-2 receives the polling request and then reads the unit identification number ID2 and the application number, SC2 stored in the memory 43-2, as the identification information. In step S52, the secure element 34-2 sends a polling response.

In step S34, the front end 32 receives the polling response and then transfers the polling response to the main controller 33. At this point, the front end 32 puts the secure element 34-2 into the deactivated state. With this arrangement, the power consumption can be reduced. In step S6, the main controller 33 receives the polling response. As a result, the main controller 33 can know the identification information of the secure element 34-2 connected to the terminal ST2 (and also connected to the terminal DATA2 of the front end 32).

Similar processing is also executed on the secure element 34 connected to the terminal ST3.

That is, in step S7, the main controller 33 output an SE ON request (SE3) to the front end 32.

In step S35, the front end 32 receives the SE ON request (SE3) and then switches the communication line to the line for the secure element 34-3. That is, only the communication line 52-3 of the lines 52-1 to 52-3 is enabled. Specifically, only the secure element 34-3 is put into the activated state and the other secure elements 34-1 and 34-2 are left in the deactivated states. As a result, unwanted power consumption is reduced. In step S36, the front end 32 sends an SE ON response to the main controller 33.

In step S8, the main controller 33 receives the SE ON response to thereby make it possible to know that the communication line is switched to the line for the secure element 34-3. In step S9, the main controller 33 outputs a polling request. In step S37, the front end 32 receives the polling request via the terminal DATAB and then transfers the polling request to the secure element 34-3 through the communication line 52-3 set in step S35.

In step S71, the secure element 34-3 receives the polling request and then reads the unit identification number ID3 and the application number SC3, stored in the memory 43-3, as the identification information. In step S72, the secure element 34-3 sends a polling response.

In step S38, the front end 32 receives the polling response and then transfers the polling response to the main controller 33. At this point, the front end 32 puts the secure element 34-3 into the deactivated state. With this arrangement, the power consumption can be reduced. In step S10, the main controller 33 receives the polling response. With this arrangement, the main controller 33 can know the identification information of the secure element 34-3 connected to the terminal ST3 (and also connected to the terminal DATA3 of the front end 32).

In step S11, the main controller 33 outputs a store polling data request to the front end 32. As shown in FIG. 6A, the store polling data request states the number of pieces of identification information and the identification information. In step S39, the front end 32 receives the store polling data request and then stores the identification information, stated thereby, in the memory 41. Consequently, the storage state of the memory 41 becomes as shown in FIG. 10.

In step S40, the front end 32 sends a store polling data response. In step S12, the main controller 33 receives the store polling data response to make it possible to know that the storage state of the memory 41 is updated.

Figure 11:
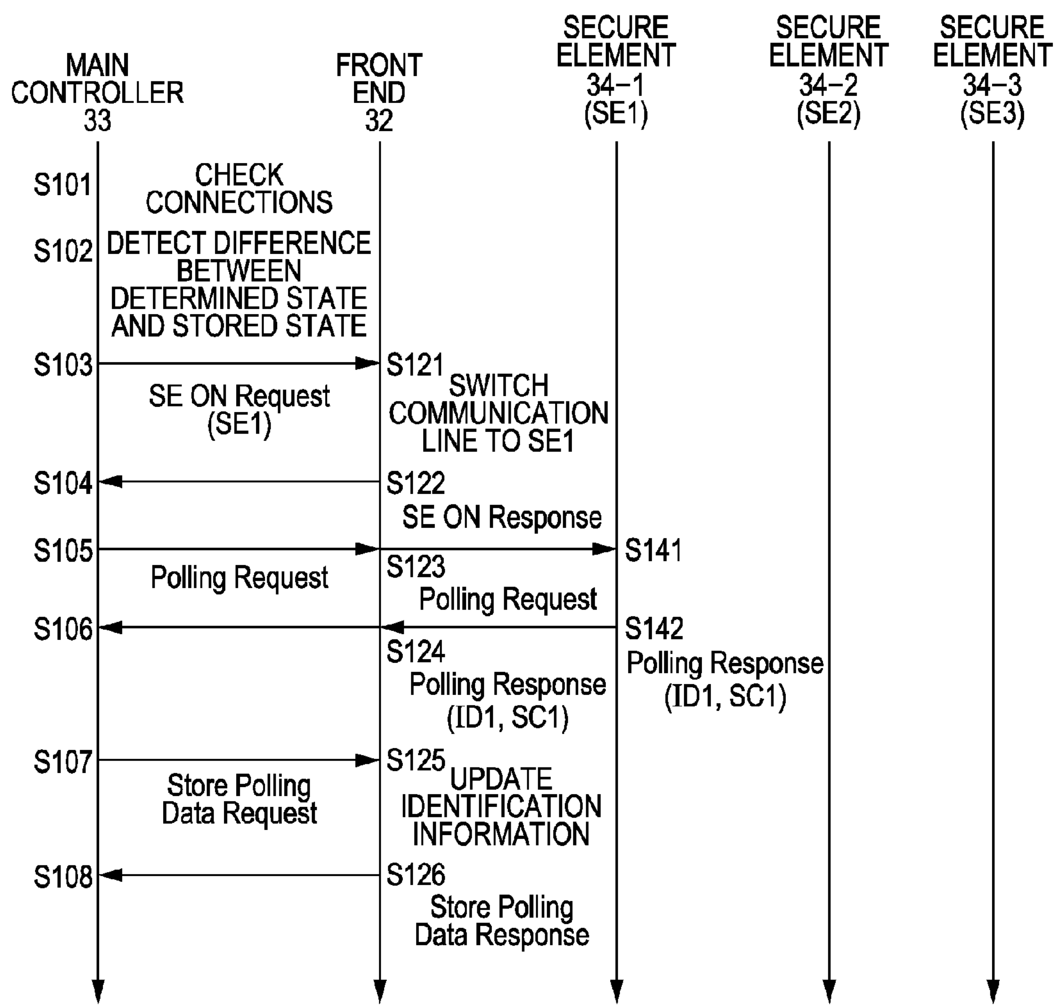
FIG. 11 is a flowchart illustrating processing when a secure element is attached.

For example, in a case in which the storage state of the memory 41 is as shown in FIG. 10, (i.e., a case in which the secure elements 34-2 and 34-3 are connected), when the secure element 34-1 is newly connected, processing as shown in FIG. 11 is executed.

In step S101, the main controller 33 checks the connections of the secure elements 34. Specifically, the main controller 33 determines whether or not the secure elements 34-1 to 34-3 are connected to the terminals ST1 to ST3.

In step S102, the main controller 33 detects a difference between the determined connection state and the state stored in the front end 32. In this case, the storage state of the memory 41 is as shown in FIG. 10. As a result, it is determined that the new secure element 34 is connected to the terminal ST1.

In step S103, the main controller 33 output an SE ON request (SE1) to the front end 32.

In step S121, the front end 32 receives the SE ON request (SE1) and then switches the communication line to the line for the secure element 34-1. Thus, only the communication line 52-1 of the lines 52-1 to 52-3 is enabled. Specifically, only the secure element 34-1 is put into the activated state and the other secure elements 34-2 and 34-3 are left in the deactivated states. As a result, unwanted power consumption is reduced. In step S122, the front end 32 sends an SE ON response to the main controller 33.

In step S104, the main controller 33 receives the SE ON response to thereby make it possible to know that the communication line is switched. In step S105, the main controller 33 outputs a polling request. In step S123, the front end 32 receives the polling request via the terminal DATAB and then transfers the polling request to the secure element 34-1 through the communication line 52-1 set in step S121.

In step S141, the secure element 34-1 receives the polling request and then reads the unit identification number ID1 and the application number SC1, stored in the memory 43-1, as the identification information. In step S142, the secure element 34-1 sends a polling response.

In step S124, the front end 32 receives the polling response and then transfers the polling response to the main controller 33. At this point, the front end 32 puts the secure element 34-1 into the deactivated state. With this arrangement, the power consumption can be reduced. In step S106, the main controller 33 receives the polling response. As a result, the main controller 33 can know the identification information of the secure element 34-1 connected to the terminal ST1 (and also connected to the terminal DATA1 of the front end 32).

In step S107, the main controller 33 outputs a store polling data request to the front end 32. The store polling data request states the number of pieces of identification information and the identification information. In step S125, the front end 32 receives the store polling data request and then stores the identification information, stated thereby, in the memory 41. Consequently, the storage state of the memory 41 becomes as shown in FIG. 9.

In step S126, the front end 32 sends a store polling data response. In step S108, the main controller 33 receives the store polling data response to make it possible to check that the storage state of the memory 41 is updated.

Figure 12:
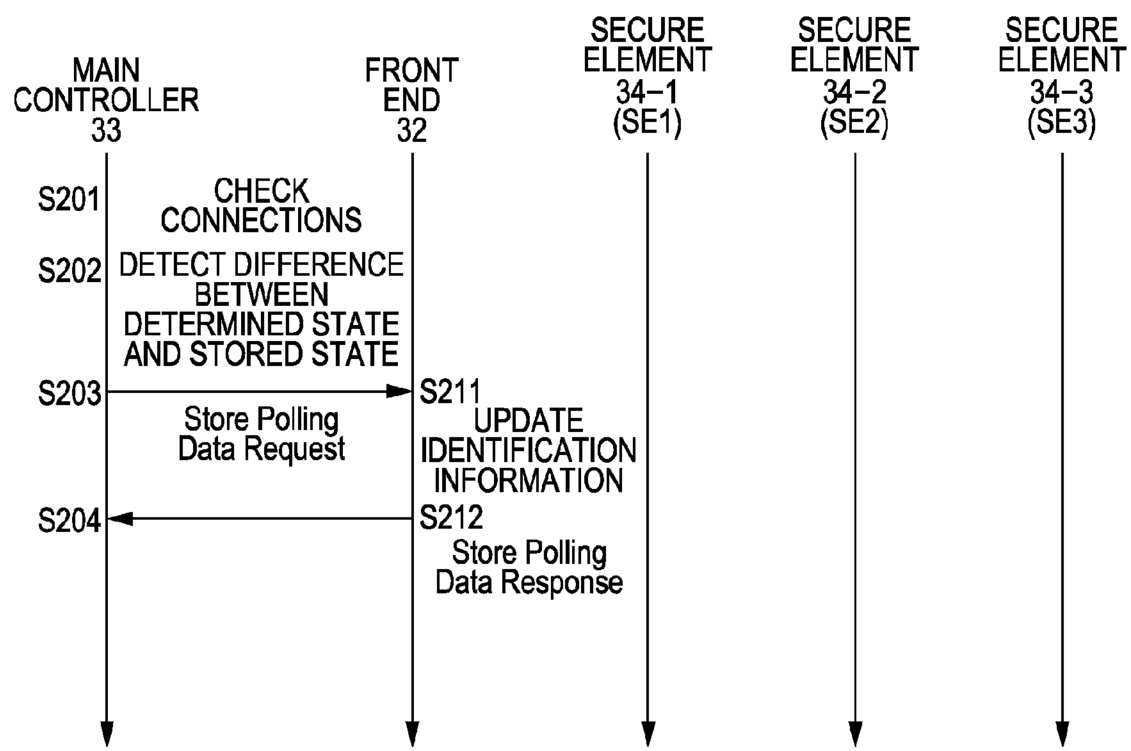
FIG. 12 is a flowchart illustrating processing when a secure element is detached.

For example, in a case in which the storage state of the memory 41 is as shown in FIG. 9, (i.e., a case in which the secure elements 34-1, 34-2, and 34-3 are connected), when the secure element 34-2 is detached, processing as shown in FIG. 12 is executed.

That is, in step S201, the main controller 33 checks the connections of the secure elements 34. Specifically, the main controller 33 determines whether or not the secure elements 34-1 to 34-3 are connected to the terminals ST1 to ST3.

In step S202, the main controller 33 detects a difference between the determined connection state and the state stored in the front end 32. In this case, the storage state of the memory 41 is as shown in FIG. 9. As a result, it is determined that the secure element 34-2 connected to the terminal ST2 has been detached.

In step S203, the main controller 33 outputs a store polling data request to the front end 32. The store polling data request states the number of pieces of identification information and the identification information. In step S211, the front end 32 receives the store polling data request and then stores the identification, stated thereby, in the memory 41. Consequently, the storage state of the memory 41 becomes a state in which only the identification information corresponding to terminal number 2 is not stored, as shown in FIG. 13.

In step S212 shown in FIG. 12, the front end 32 sends a store polling data response. In step S204, the main controller 33 receives the store polling data response to make it possible to check that the storage state of the memory 41 is updated.

Processing for a case in which the external contactless communication device 12 accesses the contactless communication device 11 will now be described with reference to FIG. 14.

In step S261, the obtaining section 91 of the external contactless communication device 12 outputs a get polling data request. In step S281, the front end 32 receives the get polling data request and then reads the identification information stored in the memory 41. As described above with reference to FIG. 8, the memory 41 pre-stores the identification information of the secure elements 34 held by the contactless communication device 11. In step S282, the front end 32 sends a get polling data response. The get polling data response states the read identification information.

The front end 32 does not transfer the get polling data request to any secure element 34 and thus the secure element 34 does not respond to the get polling data request. That is, the front end 32, instead of the secure element 34, responds to the polling data request for collecting the identification information. This arrangement prevents occurrence of collision due to simultaneous outputting of responses from the front end 32 and the secure element 34. This makes it possible to quickly and reliably supply the identification information to the external contactless communication device 12.

Each secure element 34 is in the deactivated state, until it receives an SE ON request from the front end 32. Thus, for example, compared to a case in which all secure elements 34 are left in the activated states in preparation for a request issued from the external contactless communication device 12, it is possible to reduce the power consumption.

In step S262, the obtaining section 91 of the external contactless communication device 12 receives the get polling data response. In step S263, the selecting section 92 of the external contactless communication device 12 selects the identification information of the secure element 34 to be processed. For example, when the secure element 34 to be processed is assumed to be the secure element 34-3, the selecting section 92 selects the identification information of the secure element 34-3.

In step S264, the setting section 93 of the external contactless communication device 12 outputs an SE ON request (SE3). In step S283, the front end 32 receives the SE ON request (SE3) and then switches the communication line to the line for the secure element 34-3. That is, of the lines 52-1 to 52-3, only the communication line 52-3 connected to the terminal DATA3 is enabled. Specifically, only the secure element 34-3 is put into the activated state and the other secure elements 34-1 and 34-2 are left in the deactivated states.

In step S284, the front end 32 sends an SE ON response. In step S265, the setting section 93 of the external contactless communication device 12 receives the SE ON response. As a result, the external contactless communication device 12 can check that the communication line is switched to the line for the secure element 34-3.

In step S266, the executing section 94 of the external contactless communication device 12 outputs a command for executing predetermined processing to the secure element 34-3. In the example shown in FIG. 14, in order to read data from the secure element 34-3, the executing section 94 specifies the secure element 34-3 and outputs a read request (SE3). In step S285, the front end 32 receives the read request (SE3) and then transfers the read request to the secure element 34-3.

Since the command is addressed to the secure element 34-3, the secure element 34-3 receives the command in step S291 and reads the specified data. In step S292, the secure element 34-3 sends a read response and outputs the read data to the external contactless communication device 12. In step S286, the front end 32 receives the read response and then transfers the read response to the external contactless communication device 12.

In step S267, the executing section 94 of the external contactless communication device 12 receives the read response. As described above, the external contactless communication device 12 allows a predetermined one of the secure elements 34, held by the contactless communication device 11, to execute predetermined processing.

Although the above description has been given of a case in which the external contactless communication device 12 uses the get polling data request to collect the identification information, the polling request can also be used to collect the identification information. In such a case, the identification-information collection processing of the front end 32 is performed as shown in FIG. 15.

Figure 8:
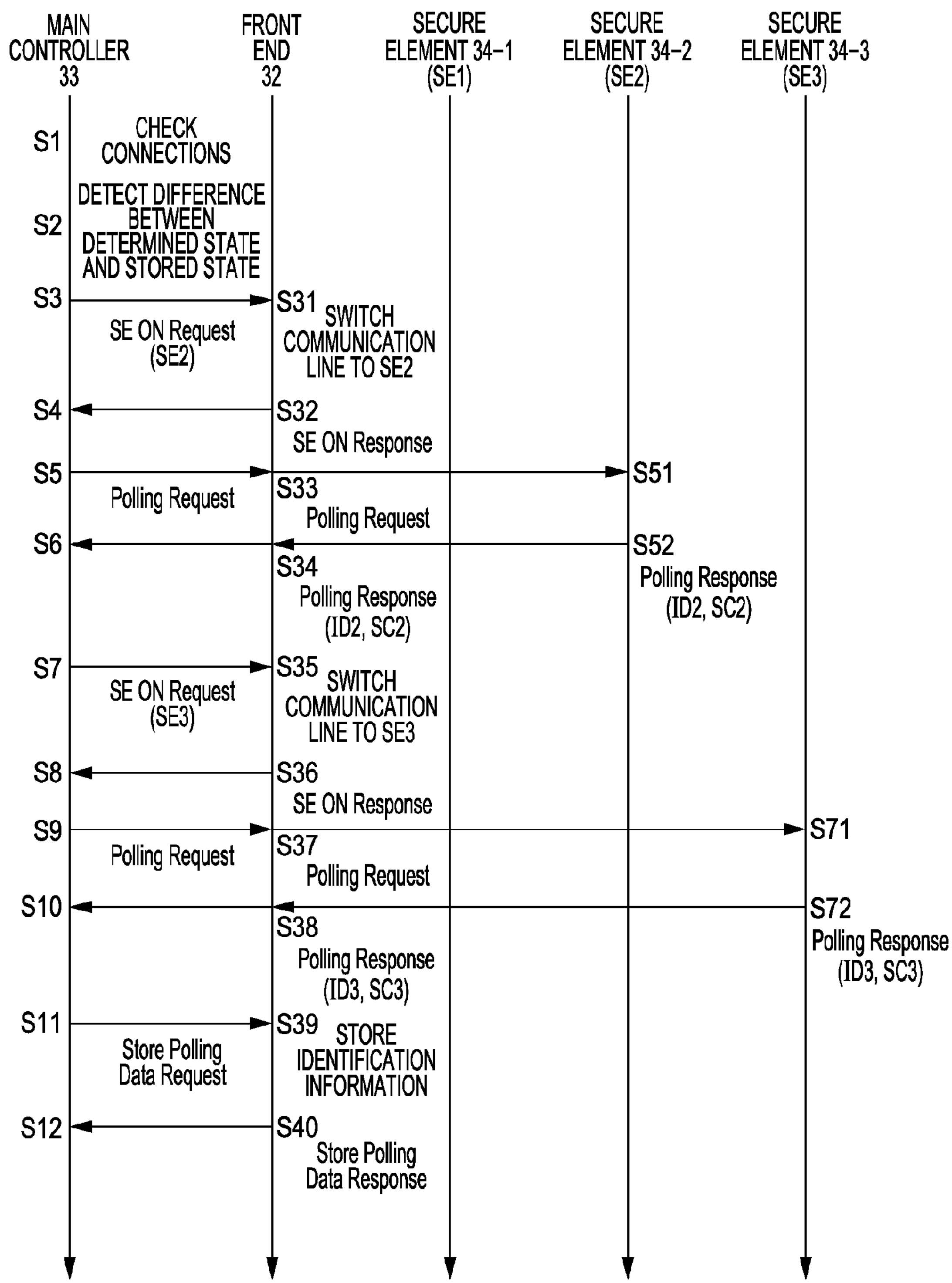
FIG. 8 is a flowchart illustrating processing for storing identification information.

The processing shown in FIG. 15 is basically the same as the processing shown in FIG. 8. That is, processing in steps S321 to S332 (shown in FIG. 15) at the main controller 33, steps S351 to S360 at the front end 32, steps S381 and S382 at the secure element 34-2, and steps S401 and S402 at the secure element 34-3 is analogous to the processing in steps S1 to S12 (shown in FIG. 8) at the main controller 33, steps S31 to S40 at the front end 32, steps S51 and S52 at the secure element 34-2, and steps S71 and S72 at the secure element 34-3. The processing shown in FIG. 15 is different from the processing shown in FIG. 8 in that, subsequent to step S332, the main controller 33 executes processing in steps S333 and S334 and the front end 32 executers processing in steps S361 and S362 correspondingly.

That is, in step S332, the main controller 33 receives a store polling data response from the front end 32 and checks that the identification information is stored in the memory 41 in the front end 32. Thereafter, in step S333, the main controller 33 outputs an SE ON (OFF) request. In step S361, the front end 32 receives the SE ON (OFF) request and then performs setting so as to prevent the secure elements 34 from responding to a polling request. Specifically, the front end 32 performs setting so that a polling request is not transferred to the secure elements 34.

In step S362, the front end 32 outputs an SE ON (OFF) response. In step S334, the main controller 33 receives the SE ON (OFF) response. Consequently, the main controller 33 confirms that a polling request is not transferred to the secure element 34.

Figure 16:
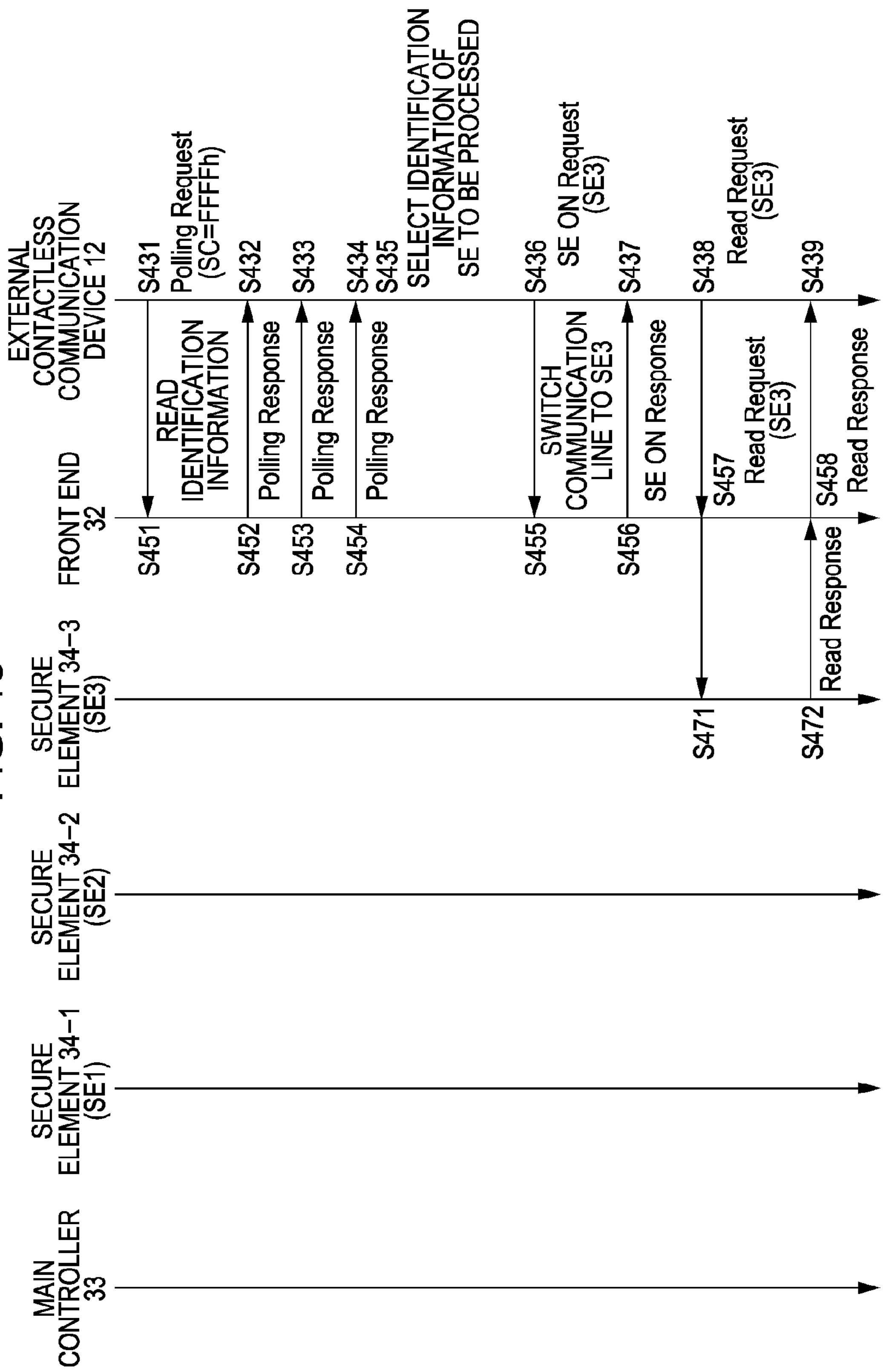
FIG. 16 is a flowchart illustrating access processing performed by the external contactless communication device.

When the identification-information collection processing of the front end 32 is performed using the polling request, as described above, access processing performed by the external contactless communication device 12 becomes as shown in FIG. 16.

That is, in step S431, the obtaining section 91 of the external contactless communication device 12 outputs a polling request. In this case, the SC in the polling request shown in FIG. 5A states FFFFh and the TSN states the maximum value (15 in this example) of the slot number. In step S451, the front end 32 receives the polling request and then sends a poling response (shown in FIG. 5B) at timing indicated by the time slot number within the maximum value.

The front end 32 associates the time slot numbers to which the polling response is to be sent with the terminal numbers of the front end 32. Specifically, as shown in FIG. 17, time slot numbers 0, 1, 2, and 3 are associated with the terminals DATAB, DATA1, DATA2, and DATA3, respectively. In the example shown in FIG. 17, the time slot number of the main controller 33 having the unit identification number IDB and the application number SCB is 0, the time slot number of the secure element 34-2 having the unit identification number ID2 and the application number SC2 is 2, and the time slot number of the secure element 34-3 having the unit identification number ID3 and the application number SC2 is 3.

Thus, in step S452, at the time slot with number 0, the front end 32 outputs a polling response stating the identification number IDB and the application number SCB to the external contactless communication device 12. In step S453, at the time slot with number 2, the front end 32 outputs a polling response stating the identification number ID2 and the application number SC2 to the external contactless communication device 12. In step S454, at the time slot with number 3, the front end 32 outputs a polling response stating the identification number ID3 and the application number SC2 to the external contactless communication device 12. That is, identification information as shown in FIG. 18 is transmitted to the external contactless communication device 12.

However, for example, when the TSN stated in the polling request is 1, only the times slots with numbers 0 and 1 can be used and the time slots with numbers 2 and 3 cannot be used. As a result, as shown in FIG. 19, at the time slot with number 0, only a polling response stating the identification number IDB and the application number SCB is output. Thus, when the identification information is to be collected, it is preferable that the maximum value of the time slot number be set in the TSN.

When the SC in the polling request specifies a predetermined application number other than FFFFh, only identification information corresponding to the application number is output. For example, in a case in which the identification information shown in FIG. 17 is stored in the memory 41, when SC2 is specified as the SC, the identification number ID2 and the application number SC2 are output as a polling response at timing indicated by the time slot with number 2 and the identification number ID3 and the application number SC2 are output as a polling response at timing indicated by the time slot with number 3, as shown in FIG. 20.

For example, in a state in which the identification information shown in FIG. 13 is stored in the memory 41, when SC1 is specified as the SC, a polling response (as shown in FIG. 21) with identification number ID1 is output at timing indicated by the time slot with number 1.

In steps S432 to S434, the obtaining section 91 of the external contactless communication device 12 receives the polling responses through the time slots with numbers 0, 2, and 3 shown in FIG. 17. The numbers of the time slots are preset so that they do not overlap each other in association with the terminals DATAB, DATA1, DATA2, and DATA3 of the front end 32, and thus no collision occurs.

In this case, as described above, since the secure elements 34 are set in step S361 in FIG. 15 so as not to respond to any polling request, the polling request is executed by only the front end 32 and is not executed by the secure elements 34. That is, the front end 32, instead of the secure elements 34, responds to the polling request for collecting the identification information, and thus, the polling response generated by the front end 32 does not collide with the polling responses generated by the secure elements 34.

Thus, the external contactless communication device 12 can quickly and reliably obtain the identification information.

In step S435, the selecting section 92 of the external contactless communication device 12 selects the identification information of the secure element 34 to be processed. For example, when the secure element 34 to be processed is assumed to be the secure element 34-3, the selecting section 92 selects the identification information of the secure element 34-3.

In step S436, the setting section 93 of the external contactless communication device 12 outputs an SE ON request (SE3). In step S455, the front end 32 receives the SE ON request (SE3) and then switches the communication line to the line for the secure element 34-3. That is, of the lines 52-1 to 52-3, only the communication line 52-3 connected to the terminal DATA3 is enabled. More specifically, only the secure element 34-3 is put into the activated state and the other secure elements 34-1 and 34-2 are left in the deactivated states.

In step S456, the front end 32 sends an SE ON response. In step S437, the setting section 93 of the external contactless communication device 12 receives the SE ON response. Consequently, the external contactless communication device 12 can check that the communication line is switched to the line for the secure element 34-3.

In step S438, the executing section 94 of the external contactless communication device 12 outputs a command for executing predetermined processing to the secure element 34-3. In the example shown in FIG. 16, in order to read data from the secure element 34-3, the executing section 94 specifies the secure element 34-3 and outputs a read request (SE3). In step S457, the front end 32 receives the read request (SE3) and then transfers the read request to the secure element 34-3.

Since the command is addressed to the secure element 34-3, the secure element 34-3 receives the command in step S471 and reads specified data. In step S472, the secure element 34-3 sends a read response and outputs the read data to the external contactless communication device 12. In step S458, the front end 32 receives the read response and then transfers the read response to the external contactless communication device 12.

In step S439, the executing section 94 of the external contactless communication device 12 receives the read response. With this arrangement, the external contactless communication device 12 allows a predetermined one of the secure elements 34, held by the contactless communication device 11, to execute predetermined processing.

Figure 22:
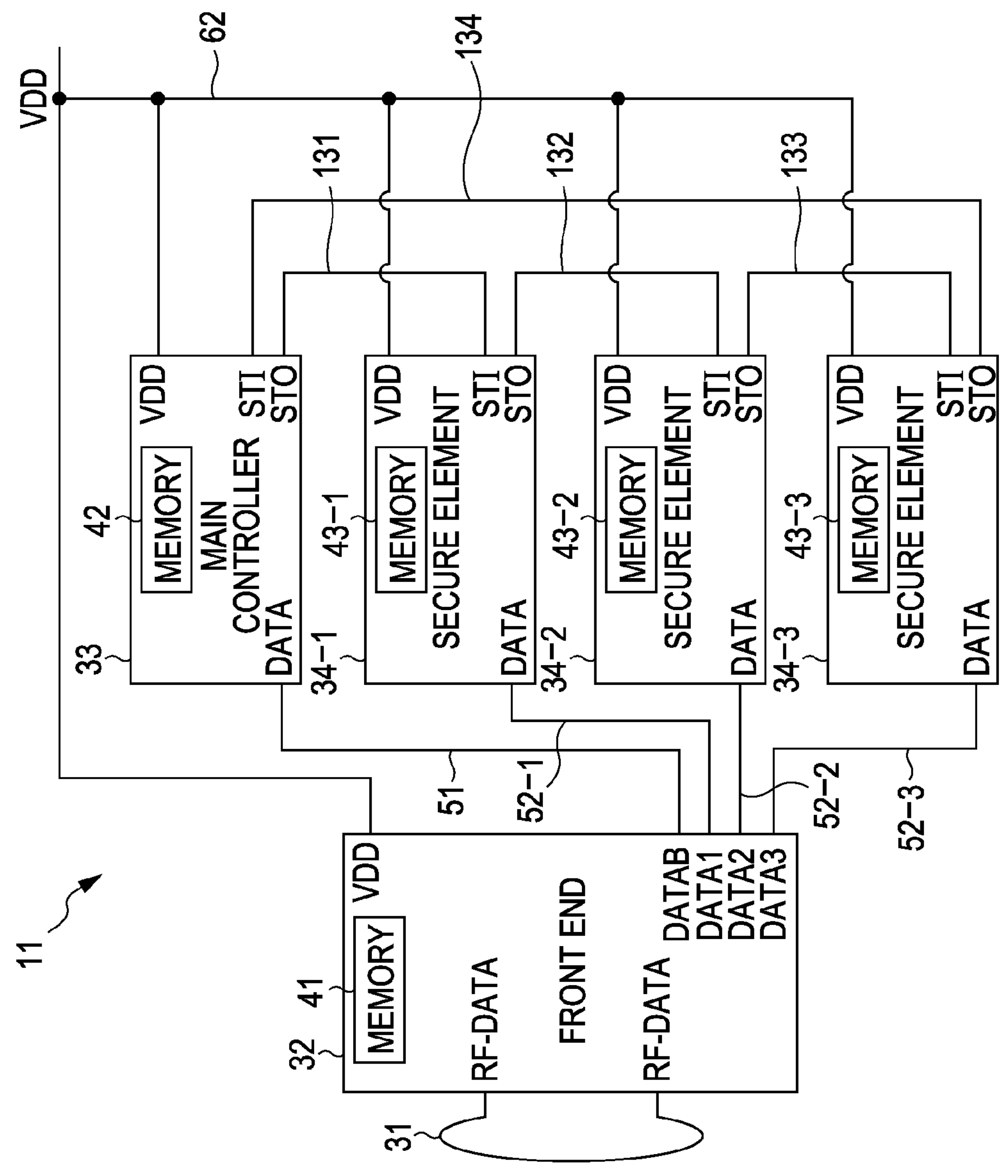
FIG. 22 is a block diagram showing the configuration of a contactless communication device according to another embodiment.

In the embodiment shown in FIG. 2, in order to detect connections, the secure elements 34 are individually connected to the main controller 33 through the lines 61-1 to 61-3. As shown in FIG. 22, however, the main controller 33 and the secure elements 34 may be connected in a looped manner. That is, in the example shown in FIG. 22, a terminal STO of the main controller 33 is connected to a terminal ST1 of the subsequent-stage secure element 34-1 through a line 131, and a terminal STO of the secure element 34-1 is connected to a terminal ST1 of the subsequent-stage secure element 34-2 through a line 132. Similarly, a terminal STO of the secure element 34-2 is connected to a terminal ST1 of the subsequent-stage secure element 34-3 through a line 133, and a terminal STO of the secure element 34-3 is connected to a terminal ST1 of the subsequent-stage main controller 33 through a line 134.

When the main controller 33 outputs a command shown in FIG. 23A from the terminal STO to the subsequent-stage secure element 34-1 through the line 131, the secure element 34-1 receives the command via the terminal ST1. The secure element 34-1 then attaches its identification information to the received command, as shown in FIG. 23B, and outputs the resulting command to the subsequent-stage secure element 34-2 via the terminal STO.

Similarly, the secure element 34-2 receives the command via the terminal ST1, attaches the identification information of the secure element 34-2 to the received command, as shown in FIG. 23C, and outputs the resulting command to the subsequent-stage secure element 34-3 via the terminal STO. The secure element 34-3 receives the command via the terminal ST1, attaches the identification information of the secure element 34-3 to the received command, as shown in FIG. 23D, and outputs the resulting command to the subsequent-stage main controller 33 via the terminal STO.

Thus, the main controller 33 can detect the identification information of all of the connected secure elements 34 from the signals input via the terminal ST1.

Figure 24:
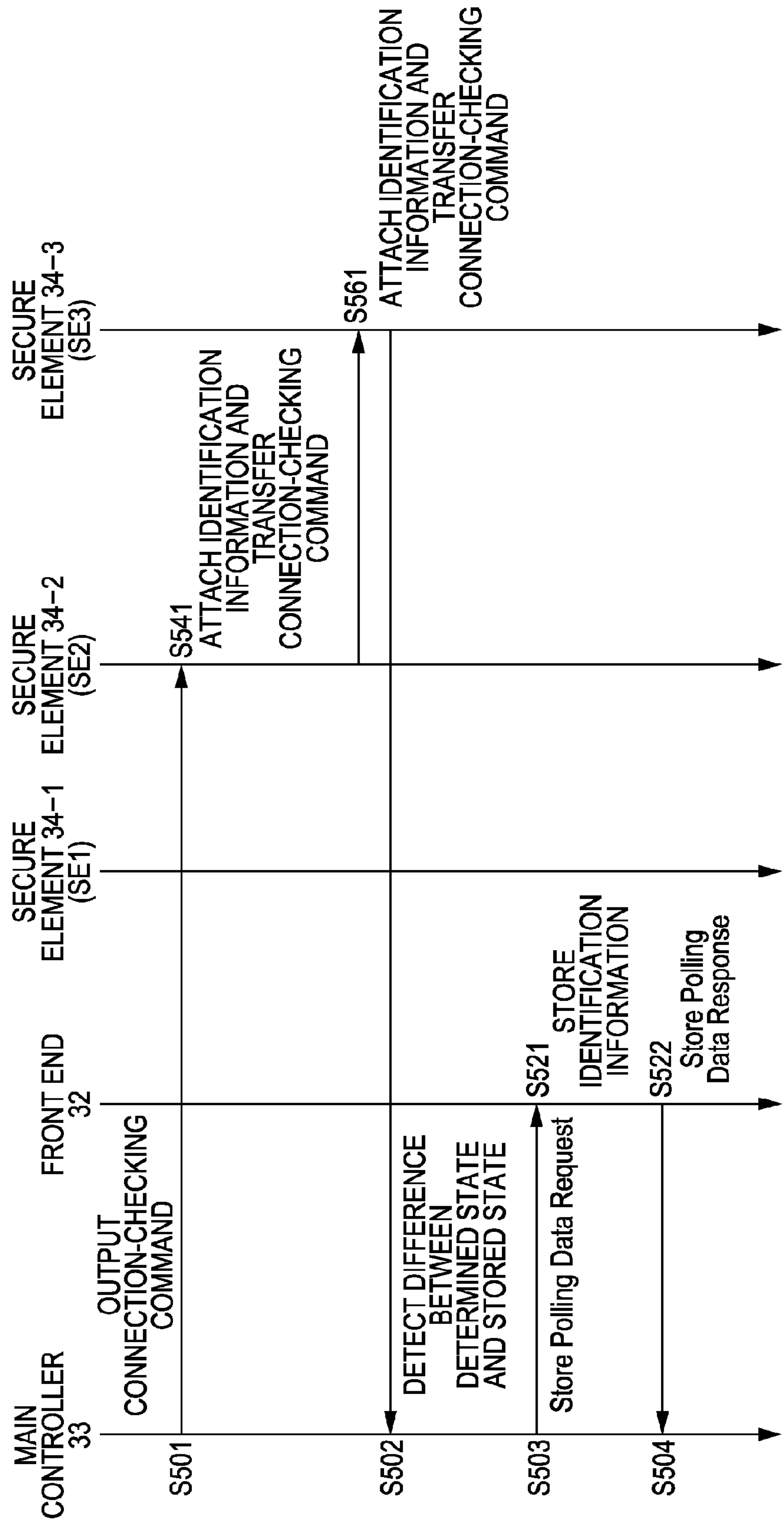
FIG. 24 is a flowchart illustrating processing for storing the identification information.

It is now assumed that the secure elements 34-2 and 34-3 are connected and the secure element 34-1 is not connected. In this case, the processing for storing the identification information in the memory 41 in the embodiment shown in FIG. 22 becomes as shown in FIG. 24.

That is, in step S501, the main controller 33 outputs a connection-checking command via the terminal STO. This command is input to the secure element 34-2 via the terminal ST1. In step S541, the secure element 34-2 receives the connection-checking command. The secure element 34-2 then attaches its identification information, stored in the memory 43-2, to the connection-checking command and transfers the resulting connection-checking command.

This connection-checking command is then input to the secure element 34-3 via the terminal ST1. In step S561, the secure element 34-3 receives the connection-checking command. The secure element 34-3 then attaches its identification information, stored in the memory 43-3, to the connection-checking command and transfers the resulting connection-checking command.

This connection-checking command is then input to the main controller 33 via the terminal ST1. In step S502, the main controller 33 detects the identification information attached to the input connection-checking command.

As a result of the above-described processing, the main controller 33 can know that the secure elements 34-2 and 34-3 are currently connected and can also know the identification information thereof. Thus, the main controller 33 detects a difference between the determined connection state and the state stored in the front end 32.

In step S503, the main controller 33 outputs a store polling data request to the front end 32. As shown in FIG. 6A, the store polling data request states the number of pieces of identification information and the identification information. In step S521, the front end 32 receives the store polling data request and then stores the identification information, stated thereby, in the memory 41.

In step S522, the front end 32 sends a store polling data response. In step S504, the main controller 33 receives the store polling data response to make it possible to check that the storage state of the memory 41 is updated.

When the identification information is collected in the memory 41 in the front end 32, as describe above, subsequent access processing performed by the external contactless communication device 12 becomes similar to that in the case shown in FIG. 14.

When the identification information is stored in the memory 41 and then processing that is similar to steps S333, S334, S361, and S362 shown in FIG. 15 is performed, the subsequent access processing performed by the external contactless communication device 12 becomes similar to that in the case shown in FIG. 16.

Figure 25:
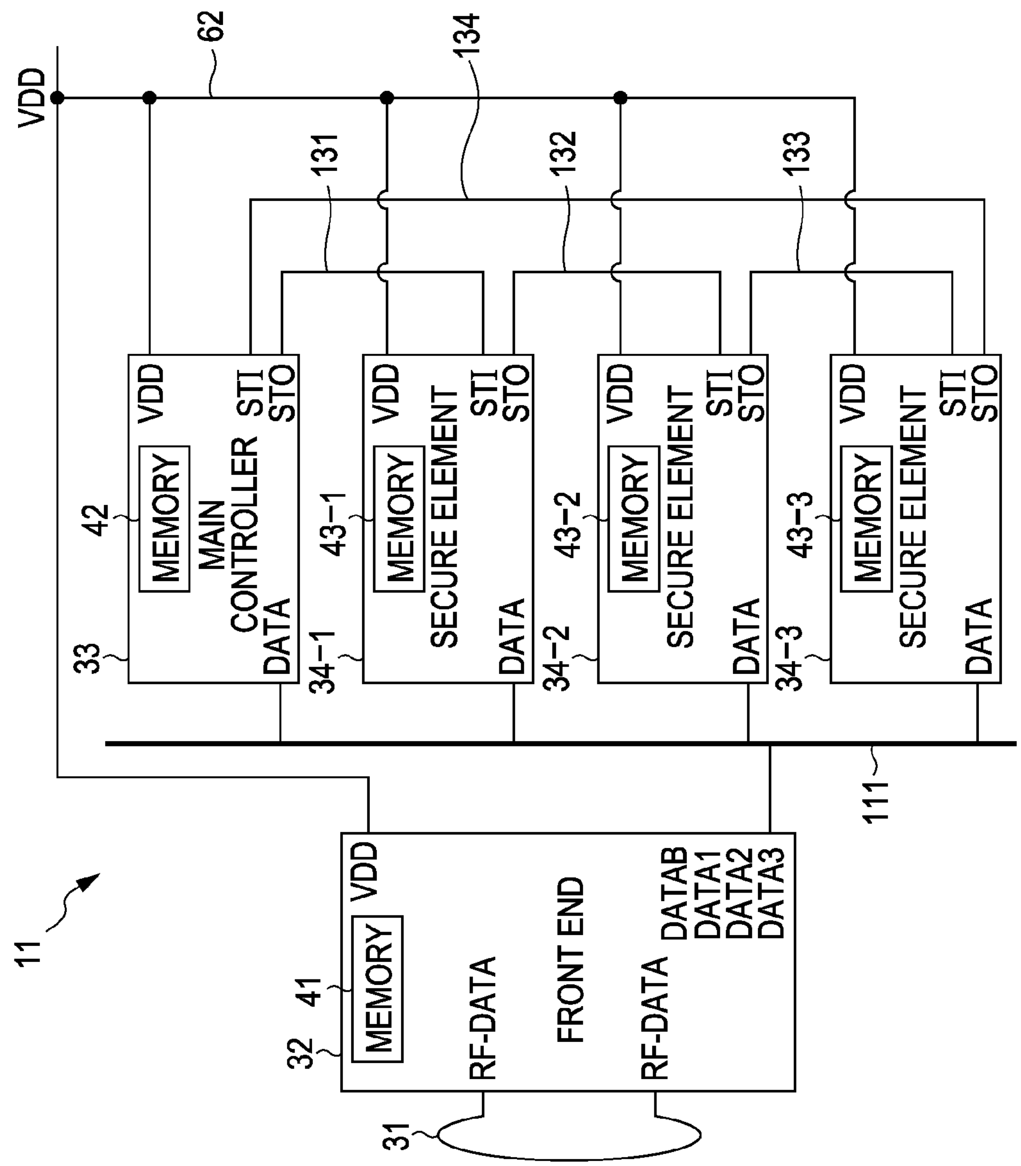
FIG. 25 is a block diagram showing the configuration of a contactless communication device according to yet another embodiment.

FIG. 25 shows an embodiment in which the front end 32, the main controller 33, and the secure elements 34-1 to 34-3 according to the embodiment shown in FIG. 22 are connected through a bus 111 instead of the lines 51 and 52-1 to 52-3. Other configurations are analogous to those in the case shown in FIG. 22.

In this embodiment, the processing for storing the identification information in the memory 41 is executed in the same manner described above with reference to FIG. 24.

Figure 26:
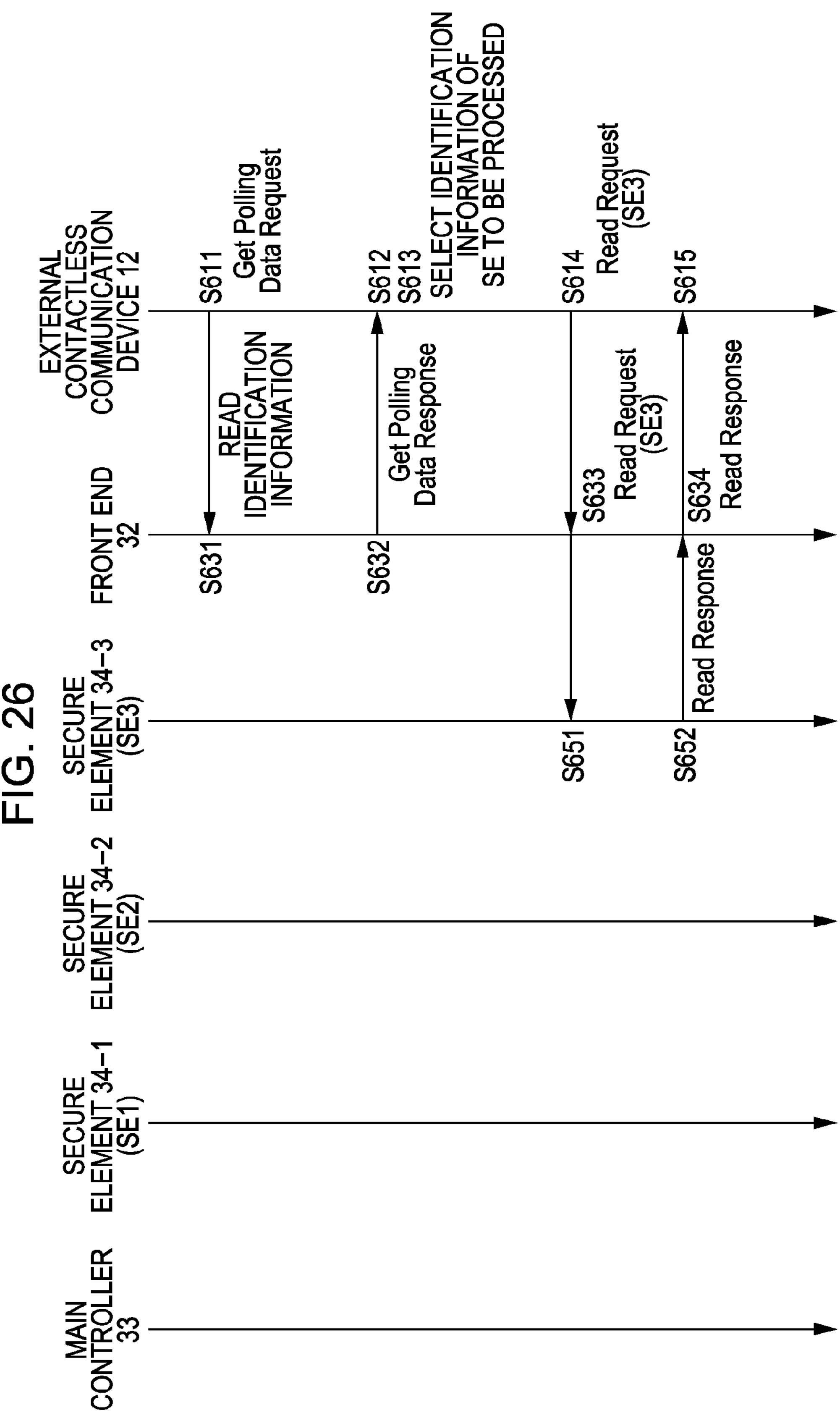
FIG. 26 is a flowchart illustrating access processing performed by the external contactless communication device.

Access processing performed by the external contactless communication device 12 in the embodiment shown in FIG. 25 will now be described with reference to FIG. 26.

In step S611, the obtaining section 91 of the external contactless communication device 12 outputs a get polling data request. In step S631, the front end 32 receives the get polling data request and then reads the identification information stored in the memory 41. As described above, the memory 41 stores the pre-collected identification information of the secure elements 34 held by the contactless communication device 11. In step S632, the front end 32 sends a get polling data response. This get polling data response states the read identification information.

Since the front end 32 does not transfer the get polling data request to any secure element 34, the secure element 34 does not respond to the get polling data request. This arrangement prevents occurrence of collision due to simultaneous outputting of responses from the front end 32 and the secure element 34.

In step S612, the obtaining section 91 of the external contactless communication device 12 receives the get polling data response. In step S613, the selecting section 92 of the external contactless communication device 12 selects the identification information of the secure element 34 to be processed. For example, when the secure element 34 to be processed is assumed to be the secure element 34-3, the selecting section 92 selects the identification information of the secure element 34-3.

In step S614, the executing section 94 of the external contactless communication device 12 outputs a command for executing predetermined processing to the secure element 34-3. In the example shown in FIG. 26, in order to read data from the secure element 34-3, the executing section 94 specifies the secure element 34-3 and outputs a read request (SE3). In step S633, the front end 32 receives the read request (SE3) and then transfers the read request to the secure element 34-3.

Since the command is addressed to the secure element 34-3, the secure element 34-3 receives the command in step S651 and reads specified data. In step S652, the secure element 34-3 sends a read response and outputs the read data to the external contactless communication device 12. In step S634, the front end 32 receives the read response and then transfers the read response to the external contactless communication device 12.

In step S615, the executing section 94 of the external contactless communication device 12 receives the read response. With this arrangement, the external contactless communication device 12 allows a predetermined one of the secure elements 34, held by the contactless communication device 11, to execute predetermined processing.

Figure 27:
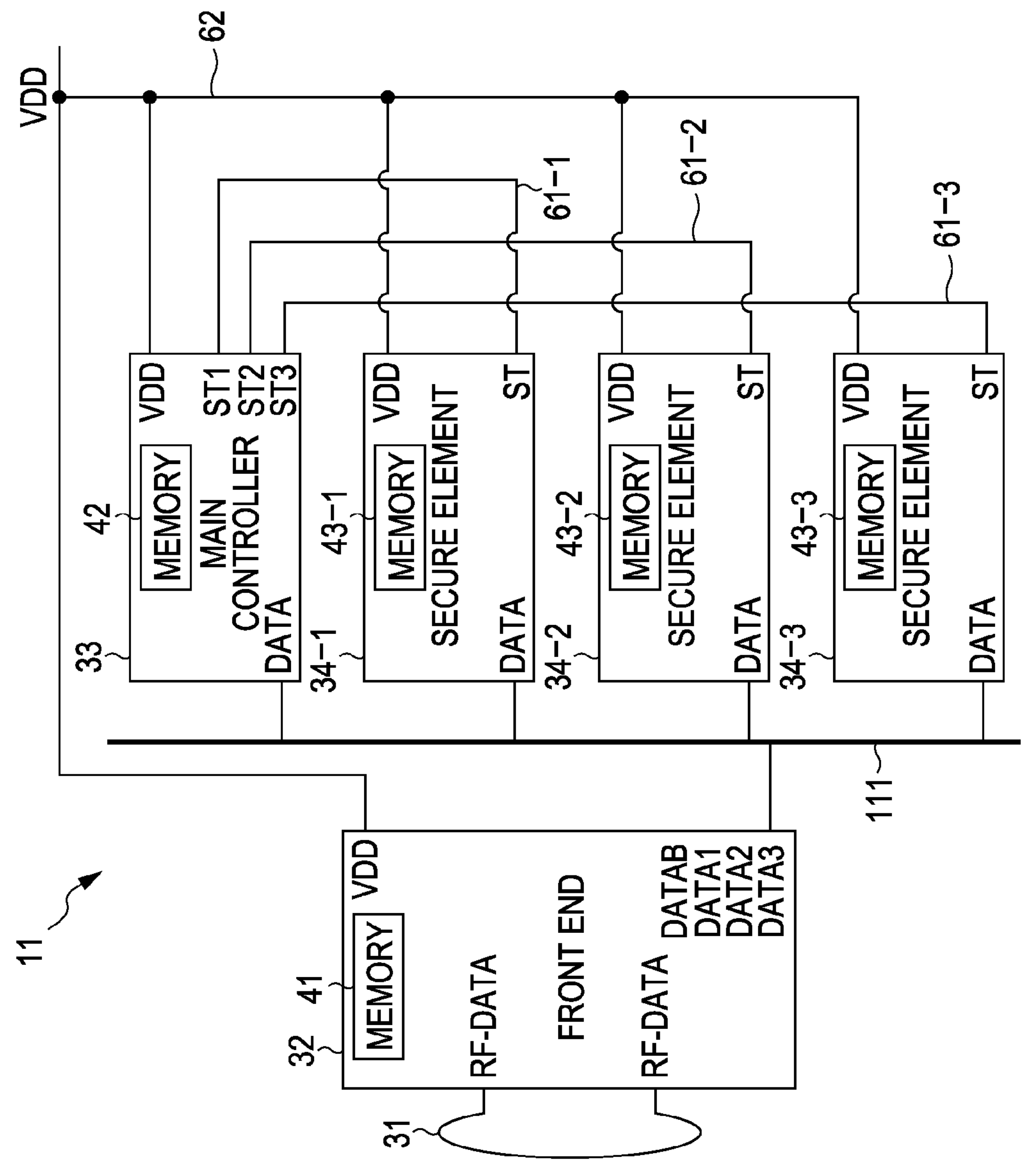
FIG. 27 is a block diagram showing the configuration of a contactless communication device according to another embodiment.

FIG. 27 shows an embodiment in which the front end 32, the main controller 33, and the secure elements 34-1 to 34-3 according to the embodiment shown in FIG. 2 are connected through a bus 111 instead of the lines 51 and 52-1 to 52-3. Other configurations are analogous to those in the case shown in FIG. 2.

The processing for collecting the identification information and storing the identification information in the memory 41 in the front end 32 in the embodiment shown in FIG. 27 will now be described with reference to FIG. 28.

In step S731, the main controller 33 outputs a polling request. Since the front end 32 is disabled to make a response even when it receives the polling request, and thus does not output a polling response.

In step S791 and S811, the secure elements 34-2 and 34-3 receive the polling request, and then send polling responses at timings indicated by numbers within the time slot numbers stated in the polling request. For example, when the secure element 34-2 selects a smaller number and the secure element 34-3 selects a larger number, the secure element 34-2 sends a polling response earlier than the secure element 34-3.

In step S792, the secure element 34-2 reads the unit identification number ID2 and the application number SC2, stored in the memory 43-2, as the identification information, and outputs the polling response stating the identification information. In step S732, the main controller 33 receives the polling response.

In step S812, the secure element 34-3 reads the unit identification number ID3 and the application number SC3, stored in the memory 43-3, as the identification information, and outputs a polling response stating the identification information. In step S733, the main controller 33 receives the polling response.

In the manner described above, the main controller 33 obtains the identification information of all of the secure elements 34.

When the secure elements 34-2 and 34-3 select the same time slot number, collision occurs. In this case, the main controller 33 repeatedly outputs a polling request until it can receive polling responses from all of the secure elements 34.

In step S734, the main controller 33 outputs a store polling data request to the front end 32. As described above, the store polling data request states the number of pieces of identification information and the identification information. In step S761, the front end 32 receives the store polling data request and then stores the identification information, stated thereby, in the memory 41.

In step S762, the front end 32 sends a store polling data response. In step S735, the main controller 33 receives the store polling data response to make it possible to check that the storage state of the memory 41 is updated.

After receiving the store polling data response from the front end 32 and checking that the identification information is stored in the memory 41 in the front end 32, the main controller 33 outputs an SE ON (OFF) request in step S736. In step S763, the front end 32 receives the SE ON (OFF) request and then performs setting so as to prevent the secure elements 34 from responding to a polling request sent from the external contactless communication device 12. Specifically, the front end 32 performs setting so that a polling request sent from the external contactless communication device 12 is not transferred to the secure elements 34.

This arrangement has an advantage that is similar to that in the case in step S361 shown in FIG. 15. That is, in step S831 described below and shown in FIG. 29, the external contactless communication device 12 outputs a polling request in which FFFFh is set in the SC, and both of the front end 32 and the secure element 34 send polling requests, thereby preventing the occurrence of collision.

In step S764, the front end 32 outputs an SE ON (OFF) response. In step S737, the main controller 33 receives the SE ON (OFF) response. As a result, the main controller 33 confirms that the polling request from the external contactless communication device 12 is not transferred to the secure element 34.

When the identification-information collection processing of the front end 32 is performed using the polling request, as described above, access processing performed by the external contactless communication device 12 becomes as shown in FIG. 29.

In FIG. 29, processing corresponding to steps S436, S437, S455, and S456 shown in FIG. 16 is eliminated. Other processing in FIG. 29 is analogous to that in the case shown in FIG. 16. That is, the processing in steps S431 to S435, S438, and S439 (shown in FIG. 16) at the external contactless communication device 12, steps S451 to S454, S457, and S458 at the front end 32, and steps S471 and S472 at the secure element 34-3 is analogous to processing in steps S831 to S837 (shown in FIG. 29) at the external contactless communication device 12, steps S851 to S856 at the front end 32, and steps S871 and S872 at the secure element 34-3.

In the embodiment shown in FIG. 27, since the front end 32 and the secure elements 34 are connected through the bus 111, the communication line is not switched to an individual line. Thus, processing corresponding to steps S436, S437, S455, and S456 shown in FIG. 16 is eliminated.

Figure 28:
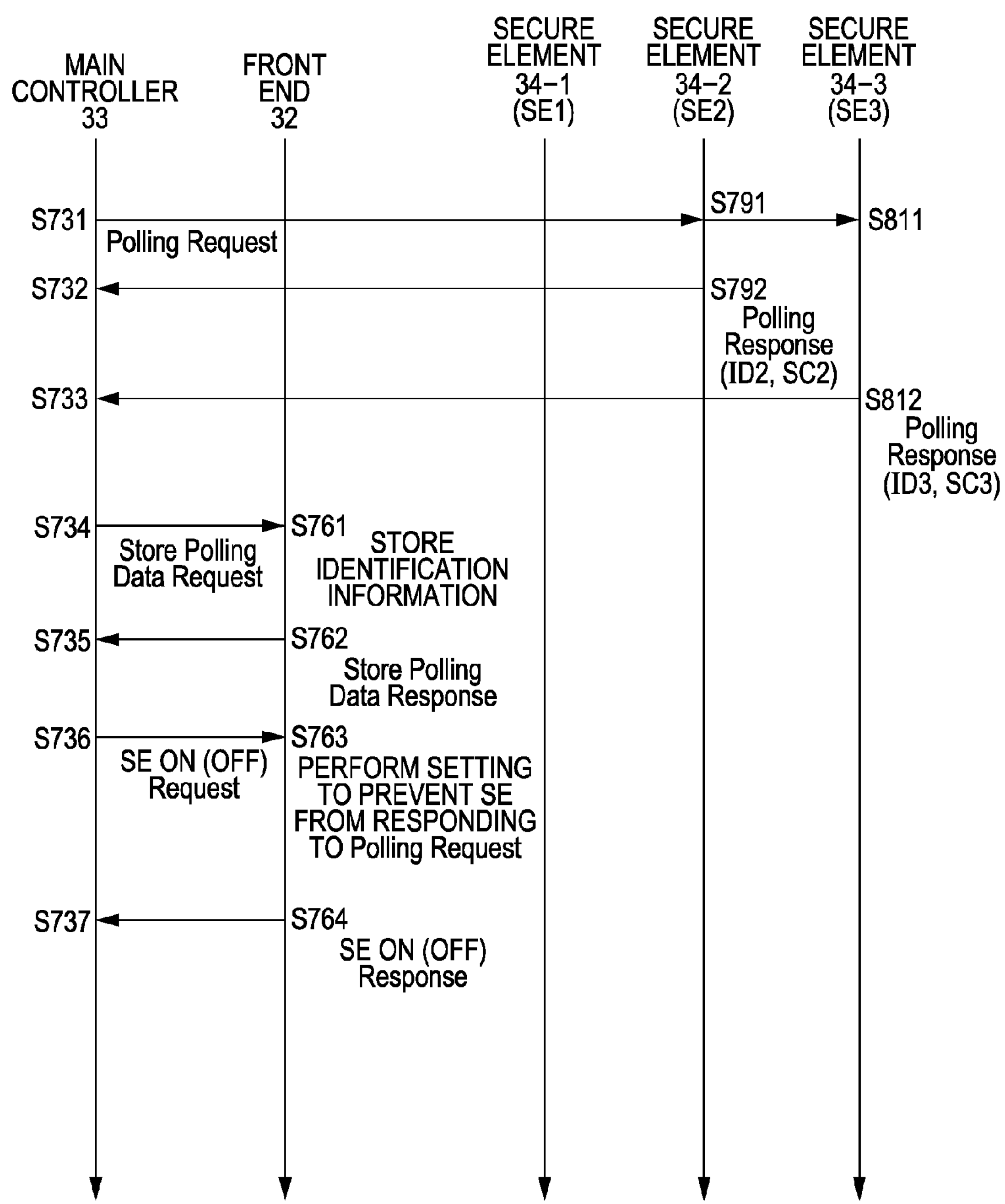
FIG. 28 is a flowchart illustrating processing for storing the identification information.

In an example shown in FIG. 28, collision can occur during collection of the identification information to be stored in the memory 41. However, when the external contactless communication device 12 collects the identification information, no collision occurs. This makes it possible to quickly and reliably supply the identification information to the external contactless communication device 12.

Although a case in which the present application is applied to the information processing system 1 including the contactless communication device 11 and the external contactless communication device 12 has been described above by way of example, the present application is also applicable to information processing apparatuses other than the contactless communication device 11 and the external contactless communication device 12 in an embodiment. The present application is also applicable to contactless communication that does not comply with the NFC standard in an embodiment.

The above-described series of processing can be executed by hardware or software. When the series of processing is executed by software, a program included in the software is installed from a program storage medium to, for example, a computer incorporated in dedicated hardware or to a general-purpose personal computer that is capable of executing various functions through installation of programs.

Examples of the program storage medium that stores the program that becomes executable by a computer through installation thereto include a removable medium (which is a package medium) and a ROM and a hard disk that temporarily or permanently store the program. Examples of the removable medium include a magnetic disk (including a flexible disk), an optical disk (including a CD-ROM [compact disk-read only memory], a DVD [digital versatile disc], and a magneto-optical disk), and a semiconductor memory. The program is stored on the storage medium through a wired or wireless communication media (such as a local network, the Internet, and/or digital satellite broadcast) via a reporting section (serving as an interface, such as a router or modem), as appropriate.

Herein, the steps for describing the program not only include processing that is time-sequentially performed according to the described sequence, but also include processing that is concurrently or individually executed without being necessarily time-sequentially processed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus comprising:

processing sections that each include a first terminal and a second terminal, that have respective identification information, and that perform processing corresponding to a request from another information processing apparatus;

a reporting section that includes a first memory that stores the respective identification information of the processing sections and, instead of the processing sections, that reports the identification information to the another information processing apparatus in response to a request for reporting the identification information, the request being issued from the another information processing apparatus; and a controlling section that includes a second memory and is separate from the reporting section and the processing sections, the second memory being different from the first memory;

wherein the reporting section is connected to each of the controlling section and the first terminal of each of the respective processing sections through a plurality of individual wired communication lines, wherein each one of the plurality of individual wired communication lines connected to the each of the controlling section and the processing sections is separate from each other individual wired communication line of the plurality of individual wired communication lines, and wherein the controlling section collects the identification information of the processing sections through the second terminal of each of the respective processing sections, stores the identification information in the second memory, and causes the reporting section to store the collected identification information in the first memory, which is different from the second memory.

2. The information processing apparatus according to claim 1, wherein the information processing apparatus and the another information processing apparatus perform contactless communication with each other, and the reporting section prevents the processing sections from responding to the request for reporting the identification information.

3. The information processing apparatus according to claim 2, wherein the reporting section mediates communication between the another information processing apparatus and the processing sections.

4. The information processing apparatus according to claim 3, wherein the reporting section selectively connects to one of the processing sections through one of the individual wired communication lines.

5. The information processing apparatus according to claim 4, wherein the controlling section collects the identification information of the processing sections when power is turned on and stores the identification information in the second memory, and the processing sections are attached or detached and that causes the reporting section to store the collected identification information in the first memory, which is different from the second memory.

6. The information processing apparatus according to claim 5, wherein the controlling section obtains the identification information by individually specifying one of the individual wired communication lines for the processing sections and causes the reporting section to store the obtained identification information.

7. The information processing apparatus according to claim 6, wherein the contactless communication is based on a near field communication standard.

8. The information processing apparatus according to claim 3, wherein the reporting section and the processing sections store, as the identification information, numbers for identifying the processing sections and numbers of applications held by the processing sections.

9. The information processing apparatus according to claim 5, wherein the controlling section is individually connected to the processing sections in order to check connections with the processing sections.

10. The information processing apparatus according to claim 5, wherein the controlling section is connected to the processing sections in a looped manner in order to check connections with the processing sections; and each processing section attaches the identification information of the processing section to a command sent from a previous stage and outputs a resulting command.

11. The information processing apparatus according to claim 10, wherein the controlling section outputs the command to the processing sections through the looped connection, causes the processing sections to attach the identification information of the processing sections to the command and to output the resulting command, obtains the output command, and causes the reporting section to store the obtained identification information in the first memory, which is different from the second memory.

12. An information processing method for an information processing apparatus, the method comprising:

causing a reporting section that includes a first memory to obtain identification information of processing sections that each include a first terminal and a second terminal and to store the identification information, wherein the reporting section is connected to each of a controlling section, which includes a second memory, and the first terminal of each of the respective processing sections through a plurality of individual wired communication lines, the second memory being different from the first memory, wherein each one of the plurality of individual wired communication lines connected to the each of the controlling section and the processing sections is separate from each other individual wired communication line of the plurality of individual wired communication lines, wherein the controlling section is separate from the reporting section and the processing sections, and wherein the controlling section collects the identification information of the processing sections through the second terminal of each of the respective processing sections, stores the identification information in the second memory, and causes the reporting section to store the collected identification information in the first memory, which is different from the second memory;

causing the reporting section, instead of the processing sections, to report the identification information to another information processing apparatus in response to a request for reporting the identification information, the request being issued from the another information processing apparatus; and causing, of the processing sections, the processing section specified by the identification information reported to the another information processing apparatus to perform processing corresponding to the request issued from the another information processing apparatus.

13. A non-transitory computer readable storage medium storing a computer program for causing a computer to execute processing comprising:

causing a reporting section that includes a first memory to obtain identification information of processing sections that each include a first terminal and a second terminal and to store the identification information, wherein the reporting section is connected to each of a controlling section, which includes a second memory, and the first terminal of each of the respective processing sections through a plurality of individual wired communication lines, the second memory being different from the first memory, wherein each one of the plurality of individual wired communication lines connected to the each of the controlling section and the processing sections is separate from each other individual wired communication line of the plurality of individual wired communication lines, wherein the controlling section is separate from the reporting section and the processing sections, and wherein the controlling section collects the identification information through the second terminal of each of the respective processing sections, stores the identification information in the second memory, of the processing sections and causes the reporting section to store the collected identification information in the first memory, which is different from the second memory;

causing the reporting section, instead of the processing sections, to report the identification information to another information processing apparatus in response to a request for reporting the identification information, the request being issued from the another information processing apparatus; and causing, of the processing sections, the processing section specified by the identification information reported to the another information processing apparatus to perform processing corresponding to a request issued from the another information processing apparatus.

14. An information processing apparatus comprising:

an obtaining section that obtains identification information of processing sections that each include a first terminal and a second terminal from a reporting section instead of the processing sections, the processing sections, the reporting section, and a controlling section being included in another information processing apparatus, the processing sections holding the identification information, and the reporting section obtaining the identification information from the processing sections and storing the identification information;

a selecting section that selects, from the obtained identification information of the processing sections, the identification information of the processing section to be processed; and an executing section that causes the processing section corresponding to the selected identification information to execute predetermined processing, wherein the reporting section that includes a first memory is connected to the controlling section and the first terminal of each of the respective processing sections through a plurality of individual wired communication lines, wherein each one of the plurality of individual wired communication lines connected to the each of the controlling section, which includes a second memory, and the processing sections is separate from each other individual wired communication line of the plurality of individual wired communication lines, the second memory being different from the first memory, wherein the controlling section is separate from the reporting section and the processing sections, and wherein the controlling section collects the identification information of the processing sections through the second terminal of each of the respective processing sections, stores the identification information in the second memory, and causes the reporting section to store the collected identification information in the first memory, which is different from the second memory.

15. The information processing apparatus according to claim 14, further comprising a setting section that sets, of individual communication lines for the processing sections connected to the reporting section, the individual wired communication line for the processing section corresponding to the selected identification information.

16. An information processing method comprising:

causing an obtaining section to obtain identification information of processing sections that each include a first terminal and a second terminal from a reporting section that includes a first memory instead of the processing sections, the processing sections, the reporting section, and a controlling section, which includes a second memory, being included in another information processing apparatus, the processing sections holding the identification information, the reporting section obtaining the identification information from the processing sections and storing the identification information, and the second memory being different from the first memory, wherein the reporting section is connected to each of the controlling section and the first terminal of each of the respective processing sections through a plurality of individual wired communication lines, wherein each one of the plurality of individual wired communication lines connected to the each of the controlling section and the processing sections is separate from each other individual wired communication line of the plurality of individual wired communication lines, wherein the controlling section is separate from the reporting section and the processing sections, and wherein the controlling section collects the identification information of the processing sections through the second terminal of each of the respective processing sections, stores the identification information in the second memory, and causes the reporting section to store the collected identification information in the first memory, which is different from the second memory;

causing a selecting section to select, from the obtained identification information of the processing sections, the identification information of the processing section to be processed; and causing an executing section to cause the processing section corresponding to the selected identification information to execute predetermined processing.

17. A non-transitory computer readable storage medium storing a computer program for causing a computer to execute processing comprising:

obtaining identification information of processing sections that each include a first terminal and a second terminal from a reporting section that includes a first memory instead of the processing sections, the processing sections, the reporting section, and a controlling section, which includes a second memory, being included in another information processing apparatus, the processing sections holding the identification information, the reporting section obtaining the identification information from the processing sections and storing the identification information, and the second memory being different from the first memory, wherein the reporting section is connected to each of the controlling section and the first terminal of each of the respective processing sections through a plurality of individual wired communication lines, wherein each one of the plurality of individual wired communication lines connected to the each of the controlling section and the processing sections is separate from each other individual wired communication line of the plurality of individual wired communication lines, wherein the controlling section is separate from the reporting section and the processing sections, and wherein the controlling section collects the identification information of the processing sections through the second terminal of each of the respective processing sections, stores the identification information in the second memory, and causes the reporting section to store the collected identification information in the first memory, which is different from the second memory;

selecting, from the obtained identification information of the processing sections, the identification information of the processing section to be processed; and causing the processing section corresponding to the selected identification information to execute predetermined processing.

18. An information processing system comprising:

a first information processing apparatus that has a reporting section that includes a first memory, a controlling section that includes a second memory, and processing sections that each include a first terminal and a second terminal, the reporting section obtaining identification information of the processing sections and storing the obtained identification information, and the second memory being different from the first memory; and a second information processing apparatus that issues, to the first information processing apparatus, a request for reporting the identification information;

wherein the reporting section in the first information processing apparatus, instead of the processing sections, reports the stored identification information to the second information processing apparatus in response to a request issued from the second information processing apparatus, wherein the reporting section is connected to each of the controlling section and the first terminal of each of the respective processing sections through a plurality of individual wired communication lines, wherein each one of the plurality of individual wired communication lines connected to the each of the controlling section and the processing sections is separate from each other individual wired communication line of the plurality of individual wired communication lines, wherein the controlling section is separate from the reporting section and the processing sections, and wherein the controlling section collects the identification information of the processing sections through the second terminal of each of the respective processing sections, stores the identification information in the second memory, and causes the reporting section to store the collected identification information in the first memory, which is different from the second memory, the second information processing apparatus specifies the processing section by using the identification information selected from the reported identification information and issues a request for predetermined processing to the specified processing section, and of the processing sections in the first information processing apparatus, the processing section specified by the second information processing apparatus performs the predetermined processing.

19. An information processing method comprising:

causing a reporting section that includes a first memory in a first information processing apparatus to obtain identification information of processing sections that each include a first terminal and a second terminal in the first information processing apparatus and to store the obtained identification information; and causing a second information processing apparatus to issue, to the first information processing apparatus, a request for reporting the identification information;

wherein the reporting section in the first information processing apparatus, instead of the processing sections, reports the stored identification information to the second information processing apparatus in response to a request issued from the second information processing apparatus, and wherein the reporting section is connected to each of a controlling section, which includes a second memory, and the first terminal of each of the respective processing sections through a plurality of individual wired communication lines, the second memory being different from the first memory, wherein each one of the plurality of individual wired communication lines connected to the each of the controlling section and the processing sections is separate from each other individual wired communication line of the plurality of individual wired communication lines, wherein the controlling section is separate from the reporting section and the processing sections, and wherein the controlling section collects the identification information of the processing sections through the second terminal of each of the respective processing sections, stores the identification information in the second memory, and causes the reporting section to store the collected identification information in the first memory, which is different from the second memory, the second information processing apparatus specifies the processing section by using the identification information selected from the reported identification information and issues a request for predetermined processing to the specified processing section, and of the processing sections in the first information processing apparatus, the processing section specified by the second information processing apparatus performs the predetermined processing.

20. The information processing apparatus according to claim 1, wherein each of the individual wired communication lines are connected to a terminal at the reporting section and a terminal at one of the processing sections.

21. A front end apparatus comprising:

a first memory that stores respective identification information of a main controller, which includes a second memory, and a plurality of secure processing sections that each include a first terminal and a second terminal, the second memory being different from the first memory; and an interface including a plurality of terminals, wherein each of the main controller and the plurality of secure processing sections are individually connected to the terminals via a plurality of individual wired communication lines, wherein each one of the plurality of individual wired communication lines connected to the each of the main controller and the first terminal of each of the respective plurality of secure processing sections is separate from each other individual wired communication line of the plurality of individual wired communication lines, and wherein the main controller collects the identification information of the plurality of secure processing sections through the second terminal of each of the respective processing sections, stores the identification information in the second memory, and causes the first memory, which is different from the second memory, to store the collected identification information.

22. The information processing apparatus according to claim 1, wherein at least one of the processing sections is configured to receive the request from the another information processing apparatus directly from the reporting section and independent of the controlling section.

* * * * *